United States Patent

[11] 3,627,749

[72] Inventors  Hans Ackermann;
               Herbert Seiler; Hubert Meindl, all of
               Riehen, Switzerland
[21] Appl. No. 800,300
[22] Filed     Nov. 8, 1968
[45] Patented  Dec. 14, 1971
[73] Assignee  J. R. Geigy A.G.
               Basel, Switzerland
[32] Priorities July 10, 1963
[33]           Switzerland
[31]           8591/63;
               Aug. 19, 1963, Switzerland, No. 10134/63;
               Jan. 8, 1965, Switzerland, No. 265/65
               Continuation of application Ser. No.
               517,998, Jan. 3, 1966, now abandoned,
               and a continuation-in-part of 380,677, July
               7, 1964, now abandoned. This application
               Nov. 8, 1968, Ser. No. 800,300

[54] MONO-AND DISAZO DYESTUFFS CONTAINING TRIAZINYLUREYLENE GROUPS
     6 Claims, No Drawings

[52] U.S. Cl. .................................................. 260/153,
     8/4, 8/41, 8/42, 8/43, 8/50, 8/51, 8/71, 117/138.8,
     260/37, 260/141, 260/146, 260/147, 260/148,
     260/149, 260/151, 260/163, 260/186, 260/191,
     260/196, 260/199, 260/242, 260/249, 260/249.8,
     260/314.5, 260/372, 260/374
[51] Int. Cl. ........................................................ C09b 62/04,
                                        C09b 62/06, C09b 62/08
[50] Field of Search ............................................ 260/146,
                           153, 147, 242, 249, 249.5, 249.8

[56]              References Cited
             UNITED STATES PATENTS
     3,110,710  11/1963  Ratlee et al. .................... 260/153
     3,116,275  12/1963  Gamleu et al. .................. 260/153 X OTHER REFERENCES
Venkataraman, " The Chemistry of Synthetic Dyes," Volume 1, Ch. 5, pp. 240– 247, Academic Press Inc., Publishers, New York (1952).

*Primary Examiner*—Floyd D. Higel
*Attorney*—Wenderoth, Lind & Ponack

ABSTRACT: Reactive dyestuffs of the formula

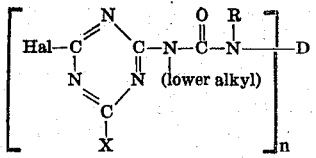

wherein $-\underset{R}{N}-$ is connected to a ring carbon of D;

R is a member selected from the group consisting of H and lower alkyl;

D is an azo dyestuff chromophoric radical

Hal is F, Cl, or Br;

n is one of the integers 1 or 2; and

X is a monovalent electron-donnor substituent, selected from the group of lower alkoxy, phenoxy, halogen-substituted phenoxy, lower alkyl-substituted phenoxy, lower alkoxy-substituted phenoxy, lower alkylthio, phenylthio, halogen-substituted phenylthio, lower alkyl-substituted phenylthio, lower alkoxy-substituted phenylthio, lower alkylamino, di(lower)alkylamino, phenylamino, N-lower alkyl-N-phenylamino, N-lower alkyl-N-halogen-phenylamino, N-lower alkyl-N-lower alkylphenylamino, N-lower alkyl-N-lower alkoxyphenylamino, piperidino or morpholino, halogen being chloro or bromo. These dyes are suitable for the dyeing of natural and synthetic polyamide fibers as well as for textile fibers containing hydroxyl groups, particularly for natural or regenerated cellulose fibers. The obtained dyeings and prints are distinguished by excellent wet fastness properties and good fastness to light.

MONO-AND DISAZO DYESTUFFS CONTAINING TRIAZINYLUREYLENE GROUPS

This application is a continuation of application Ser. No. 517,998, filed Jan. 3, 1966, abandoned since the filing of the instant application, which application is in turn a continuation-in-part of application Ser. No. 380,677, filed July 6, 1964, now abandoned.

The present invention relates to reactive dyestuffs, processes for the production thereof, their use for the dyeing of organic textile fibers containing hydroxyl and/or amino groups, as well as, as industrial product, the fiber materials dyed with the aid of these dyestuffs.

It has been found that dyestuffs which, surprisingly can be fixed onto textile fibers containing hydroxyl and amino groups and afford dyeings of good fastness properties, are obtained by reaction one mol of an organic dyestuff of the formula

(I)

wherein

D represents the radical of an organic dyestuff, capable of withstanding the conventional conditions of dyeing textile fibers containing in their molecule hydroxyl and/or amino groups with fiber-reactive dyestuffs, and subsequent fixation by thermofixing or steaming, R represents hydrogen or lower alkyl, and $n$ represents 1 or 2, with $n$ mol of a compound capable of yielding the radical of the formula

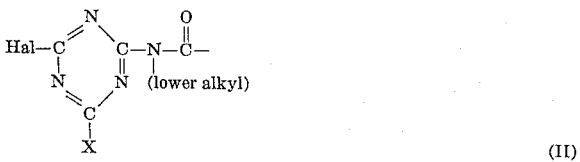

(II)

wherein

Hal represents halogen of one of the atomic numbers 9, 17, or 35, i.e., fluorine, chlorine or bromine, X represents a monovalent electron-donating substituent containing a hetero atom of one of the atomic numbers 7, 8, and 16, by way of which atom said substituent is linked to the triazinyl ring in formula II, and the molecular weight of which substituent does not exceed 200, to form a dyestuff of the formula

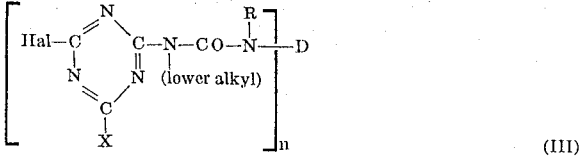

(III)

wherein

D, R, and $n$ have the same meanings as in formula I, and

Hal and X have the same meanings as in formula II, or by forming the reactive dyestuffs of formula III from components of which at least one contains the radical of formula II bound by way of an amino group of the formula $$-\underset{R}{N}-$$

"Lower" as used in this specification and in the appended claims in connection with "alkyl," "alkoxy" and the like radicals means that these radicals have from one to five carbon atoms, unless expressly stated otherwise.

It would have been expected that a triazinyl radical which is attached to an urea bridge, as it is the case in formula III, would not resist the severe conditions of dyeing textile fibers with fiber-reactive dyestuffs, namely, in particular, strong alkaline dye liquors of pH values in the order of 10 and higher, and treatment, at least during subsequent thermofixation or steaming at elevated temperatures of about 100° to 160° C. in a strongly alkaline medium, but that the triazinyl lower alkylamino radical would be split from the —CO—NR— bridge of formula III during dyeing, so that no fixation of the dyestuffs to the fiber molecule could take place.

Indeed, this would occur if X in formula III would represent an electron-accepting substituent. Furthermore, intermediates with such a substituent would not be readily available.

It is one surprising feature of the dyestuffs according to the invention that the bond of the triazinyl radical to the urea bridge in the dyestuffs of formula III, in which X has the above-defined meaning, and via the urea bridge to the dyestuff-character imparting principal moiety of the molecule in formula III is so strong that the severe conditions of reactive dyeing, especially on cotton but also on wool or nylon, are withstood without substantial decomposition, and that commercially useful dyeings of satisfactory fastness properties are obtained.

The reaction between the fiber molecule and the reactive dyes falling under formula III takes place substantially entirely by splitting off the 'Hal' substituent from the triazinyl reactive group.

In formulas I and III, D represents in particular the radical of, for example, a mono-, dis-, or polyazo dyestuff which may contain heavy metal in complex bond, an anthraquinone, a nitro or a phthalocyanine dyestuff.

In those compounds of formula III in which D represents the radical of an azo dyestuff, it is, for example, the radical of a monoazo dyestuff of the benzene-azo-benzene, benzene-azo-naphthalene, benzene-azo-pyrazole, benzene-azo-acetoacetylarylamide, naphthalene-azo-naphthalene and naphthalene-azo-pyrazole series, or the radical of a disazo dyestuff of the benzene-azo-benzene-azo-benzene, benzene-azo-naphthalene-azo-benzene and naphthalene-azo-benzene-azo-benzene series, all of which may be free from or may contain heavy metal in complex bond, or of a metal-containing formazane dyestuff.

In those compounds of formula III in which D is the radical of an anthraquinone dyestuff, it is preferably a 1-amino-4-phenylamino- or 1-amino-4-diphenylamino-anthraquinone radical.

When D is the radical of a phthalocyanine dyestuff, it is preferably the radical of phthalocyanine sulfonic acid alkylamide or arylamide, which preferably contains sulfonic acid groups.

The organic dyestuffs of formula I contain the

groups either in the internal, principal dyestuff structure or at an external substituent, such as at the benzene ring of benzoylamino or of phenyl-amino groups.

The dyestuffs mentioned can contain "shade and fastness properties-influencing" substituents.

Such "shade and fastness properties-influencing" types of substitution in the dyestuffs according to the invention are: fluorine, chlorine, bromine, lower alkyl groups having straight or branched chains such as the methyl, ethyl, propyl, isopropyl, n-butyl, tert. butyl and amyl group, cycloalkyl groups such as the cyclohexyl and the methyl-cyclohexyl group, aralkyl groups such as the benzyl or phenethyl group, ether groups such as lower alkoxy, e.g., methoxy, ethoxy, or benzyloxy or phenoxy group, lower alkyl-sulfonyl, carboxylic acid and sulfonic acid groups, acylamino groups such as the acetylamino, chloroacetylamino, β-bromopropionylamino, phenylamino and benzoylamino group, carboxylic acid amide and sulfonic acid amide groups which may be N-substituted, also the nitro, amino, carbamido, amino-phenyl-$SO_2$—NH—$SO_2$ and hydroxyl groups.

R, when representing a lower alkyl group is, for example, the methyl or ethyl group; preferably, however, it represents hydrogen.

The reactivity of dyestuffs of formula III according to the invention in which Hal is fluorine is superior to that of dyestuffs in which Hal is chlorine. They can thus be fixed onto the fiber at relatively low temperatures, whereas dyestuffs in which Hal is chlorine require higher fixing temperatures or stronger bases, e.g., sodium hydroxide, as acid-binding agents.

The lower alkyl substituent at the nitrogen atom in formula III to which the triazinyl radical is attached is, for example, methyl, ethyl, isopropyl or butyl.

The monovalent electron-donating substituent X which is of a molecular weight not exceeding 200, and preferably below 150, represents, for example, ether groups such as an alkoxy group, e.g., the methoxy or the ethoxy group; an aryloxy group, in particular the unsubstituted phenoxy group, but also a phenoxy group substituted by halogen, e.g., chlorine, by lower alkyl or lower alkoxy; a thioether group, in particular a lower alkylthio group such as the methylthio group or ethylthio group as well as an arylthio group, in particular the unsubstituted phenylthio group or a phenylthio group substituted by halogen, e.g., chlorine, by lower alkyl or lower alkoxy. Especially, however, X represents an amino group derived from a primary or secondary organic, preferably aliphatic amine, in particular a monoalkylamino or dialkylamino group such as methylamino, ethylamino, propylamino, isopropylamino, butylamino, isobutylamino, tert. butylamino, dimethylamino, diethylamino, dipropylamino or dibutylamino.

The lower mono- and dialkylamino radicals are preferred on account of the higher solubility of the resulting reactive dyestuffs of formula III.

In starting materials containing the grouping of formula II, the lower dialkylamino radicals are preferred because of the more uniform phosgenization in the synthesis of these starting materials. Furthermore, the radical X may be derived from saturated heterocyclic nitrogen bases such as piperidine or morpholine; or X may represent the radical of a phenylamino or N-lower-alkyl-N-phenylamino group the phenyl radical of which is unsubstituted or substituted by halogen, e.g., chlorine or bromine, or by lower alkyl or lower alkoxy.

Amino dyestuffs of formula I, into the molecules of which the fiber-reactive grouping according to the invention can be introduced are, for example, amino-anthraquinones such as 1-amino-4-(m- or p-amino-phenylamino)- or 4-(o'-, or m'- or p'-amino-diphenylamino)-anthraquinones and their sulfonic acids; aminophthalo-cyanines such as condensation products of phthalocyanine sulfonic acid chloride with alkylene-diamines or with arylene-diamines which may be sulfonated; and also aminoazo dyestuffs as well as the sulfonic acids thereof. The latter contain acylatable amino groups $$-\underset{R}{N}-$$

in the coupling component and/or in the diazo component.

For instance, aminoazo dyestuffs of the formula

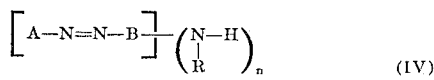
(IV)

are particularly valuable starting materials. In this formula
A represents the radical of a diazo component, particularly a benzene diphenyl or naphthalene radical which is unsubstituted or bears a "shade and fastness properties-influencing" substitution of the type further described hereinbefore,
B represents the radical of a coupling component,
R and n have the same meanings as in formula I.

Preferably A and B together contain at least two sulfonic acid groups.

The azo dyestuffs of formula IV are obtained, for example, by coupling optionally sulfonated acylamino-phenyl, acylaminodiphenyl or acylaminonaphthyl diazonium compounds or nitroaryldiazonium compounds, more particularly, for example, by coupling a diazotized acetyl-amino aniline, 4-acetylamino-4'-amino-1,1'-diphenyl or a nitroaniline which may contain sulfonic acid groups, with conventional coupling components, e.g., with those of the benzene, naphthalene, pyrazole or acyloacetyl-arylamide series, then saponifying the acylamino group or reducing the nitro group to the amino group. They are also obtained by coupling a diazonium compound with a coupling component containing acylatable amino groups, e.g., with an aminobenzene, aminonaphthalene or aminonaphthol, or also with an aminoaryl pyrazolone or aminoaryl pyrazole imine or with an acyloacetylarylamide or with their sulfonic acids.

Other valuable starting materials are metal-containing aminoazo dyestuffs of the formula

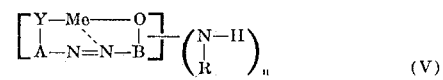
(V)

wherein
A represents a benzene or naphthalene radical which is unsubstituted or bears a "shade and fastness properties-influencing" substitution, as described hereinbefore,
B represents the radical of a coupling component,
Me represents a heavy metal of the atomic numbers 24 to 29 which can also contain other coordinated complex formers,
Y represents oxygen or the —COO—group, and
R and n have the same meanings as in formula I.

The bridge members Y and the oxygen atom in formula V are linked to A and B, respectively, in orthoposition to the azo bridge, —N=N—.

Preferably, the aminoazo dyestuffs of formula V contain at least two sulfonic acid groups.

Metallized aminoazo dyestuffs of this type are obtained, for example, by coupling optionally sulfonated acylamino-phenyl or acylamino-naphthyl or nitro-phenyl diazonium compounds which preferably contain a hydroxyl, alkoxy or carboxyl group in the o-positioned to the diazonium group, with conventional coupling components capable of coupling in a position adjacent to a hydroxyl group, e.g., phenols, naphthols, pyrazolones, or acyloacetylarylamides, and also the sulfonic acids of these compounds. They are also obtained by coupling the usual aromatic diazonium compounds, particularly optionally sulfonate o-hydroxyaryl, o-alkoxyaryl or o-carboxyaryl diazonium compounds with coupling components capable of coupling in a position adjacent to a hydroxyl group, which coupling components may contain an acylated amino group, e.g., with an aminonaphthol or acylaminonaphthol, or with an aminonaphthol or acylaminonaphthol sulfonic acid. After the acylamino group has been hydrolyzed or the nitro group has been reduced to the amino group, the aminoazo compounds obtained are converted into heavy metal complexes with agents yielding chromium, cobalt, nickel, or copper, if necessary in the presence of an oxidizing agent. To saturate any other coordination positions present, the dyestuffs according to the invention can also contain other complex-forming compounds which may have dyestuff character and are bound by way of the heavy metal, for example, water, certain tertiary amines such as pyridine or another o,o'-dihydroxy- or o-hydroxy-o'- carboxyazo dyestuff.

Compounds usable according to the invention which introduce the radical of formula II, above, into the dyestuff starting materials of formula I are mainly the carbamic acid chlorides of the formula

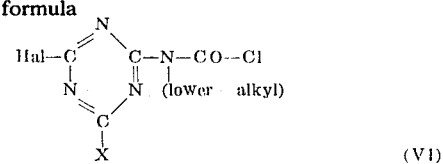
(VI)

wherein

Hal and X have the same meanings as in formula II.

The carbamic acid chlorides of formula VI are obtained by known processes, in particular by reacting halogen-amino-s-triazines compounds of the formula

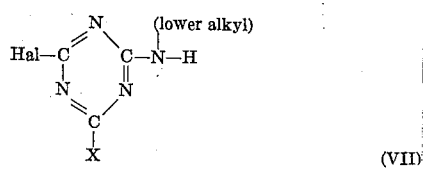

(VII)

in which

X and Hal have the same meanings as in formula II,
with phosgene in an inert organic solvent. Suitable solvents are, e.g., optionally halogenated or nitrated aromatic hydrocarbons such as toluene, chlorobenzene or nitrobenzene.

The reaction of an amino dyestuff of formula I with the acylating agent introducing the radical of formula II, preferably a compound of formula VI, is advantageously performed in aqueous solution, optionally in the presence of inert organic solvents, e.g., lower alkanols, lower aliphatic ketones or lower fatty acid amides, if necessary in the presence of buffer salts or tertiary nitrogen bases such as dialkyl anilines as acid binding agents. To prevent a premature exchange of substituents which can be split off, the reaction is performed with care under mild conditions, preferably at a pH of 4 to 8 and at as low temperatures as possible. Mild conditions are also indicated for the isolation and drying of the reaction products.

Reactive dyestuffs of formula III are also obtained by a modified process by forming them from dyestuff components which contain at least one radical of formula II bound by way of an amino group

This method is particularly suitable for the production of azo dyestuffs and comprises coupling an aromatic diazonium compound with a coupling component, at least one of which contains the characteristic fiber-reactive acylamino group according to the invention.

For example, a diazonium compound of the formula

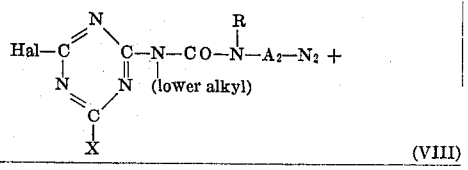

(VIII)

wherein $A_1$ represents a benzene, diphenyl or naphthalene radical or an azo dyestuff radical, which may have further "shade and fastness properties-influencing" substitution as described hereinbefore, R has the same meaning as in formula I, and Hal and X have the same meanings as in formula II,
is coupled with a coupling component B—H to form an azo dyestuff of the formula

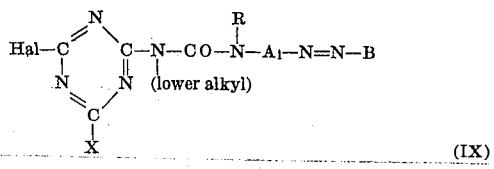

(IX)

wherein $A_1$ has the same meaning as in formula VIII, and

B represents the radical of a coupling component; if desired, metallizable dyestuffs thus obtained are then reacted with agents introducing a complex-forming heavy metal.

Diazonium compounds of formula VIII used in this process are derived from optionally sulfonated aryl-enediamines, such as p- or m-phenylenediamine sulfonic acid or 2,6-naphthylene-diamine-4,8-disulfonic acid.

Components to be coupled therewith are those conventional in azo dyestuffs, for example, those of the benzene series such as phenols or anilines, of the naphthalene series such as optionally sulfonated naphthols, naphthylamines or phenyl- and acyl-aminonaphthols, furthermore, pyrazolones, pyrazole imines or acyloacetylarylamides.

A further method of performing the process for the production of reactive dyestuffs of formula III comprises reacting an aryl diazonium compound $(A—N_2)^+$ (anion)$^-$ with a coupling component of the formula

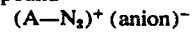
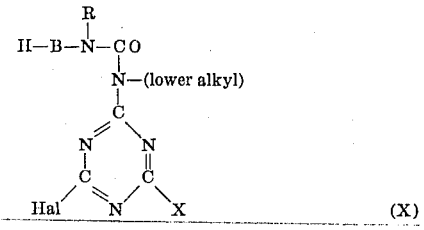

(X)

wherein

R has the same meaning as in formula I,

Hal and X have those given in formula II and

B represents the radical of an azo dyestuff-forming coupling component, to produce a dyestuff of the formula

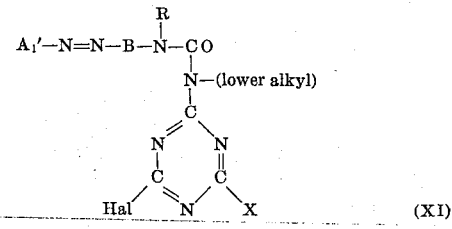

(XI)

wherein

B, Hal, R and X have the same meanings as in formula X and $A'_1$ in the diazo component $A'_1$—N = N— represents a radical of the benzene, diphenyl, naphthalene or azo dyestuff series which may be further substituted, and, if desired, converting a dyestuff thus obtained which possesses metallizable substituents in $A'_1$ and B, to a heavy metal complex thereof, with agents giving off heavy metal.

Diazotized aromatic amines usual in azo dyestuffs are used in this process as diazonium compounds, for example, optionally sulfonated phenyl, diphenyl, naphthyl or azo dyestuff diazonium compounds. The latter are especially benzene-azo-benzene-diazonium, benzene-azo-naphthalene-diazonium, or naphthalene-azo-benzene-diazonium compounds.

In formula X, B, the radical of the coupling component of the dyestuff of formula XI, represents, for example, the radical of an aminonaphthol sulfonic acid such as the radical of a 1-amino-6- or -7-hydroxy-naphthalene sulfonic acid, of 1-amino-8-hydroxynaphthalene-3,6- or 4,6-disulfonic acid, of 2-amino-8-hydroxynaphthalene-6-sulfonic acid or of 2-amino-5-hydroxynaphthalene-7-sulfonic acid, or the radical of an optionally sulfonated aminoaryl pyrazolone or pyrazole imine or of an acylacetyl-arylamide.

Azo dyestuffs containing two radicals of formula II are obtained, for example, by coupling a diazonium compound of formula VIII with a coupling component of formula X.

The coupling is performed in every case in a weakly acid to weakly alkaline medium by the visual methods.

Both the coupling and the metallization must be performed under mild conditions, i.e., high pH values and temperatures should be avoided.

The dyestuffs obtained can be stabilized with buffer substances, for example with mixtures of primary and secondary alkali phosphates or with alkali metal salts of sulfonated tertiary aromatic amines, that is, for example, with the sodium salt of N,N-dimethylaniline-3-sulfonic acid.

The preferred dyestuffs of formula III contain water-solubilizing, salt-forming groups and are suitable for the dyeing of natural and synthetic polyamide fibers containing amino groups. An aftertreatment of the dyeing with acid-binding agents such as ammonia or hexamethylenetetramine improves the wet fastness properties, especially of dyeings on wool.

Water-soluble reactive dyestuffs according to the invention which correspond to formula II and contain advantageously two to five sulfonic acid groups are mainly used, however, for the dyeing and printing of textile fibers containing hydroxyl groups, particularly for natural or regenerated cellulose fibers. Dyeings and prints are obtained which are distinguished by excellent wet fastness properties and good fastness to light by impregnating the textiles with aqueous dyestuff solutions or printing them with thickened dyestuff solutions, drying the impregnated material and treating with acid binding agents, optionally with heating or steaming, and then thoroughly rinsing and soaping.

The dyestuffs according to the invention are also suitable for the dyeing of fibers containing hydroxyl groups by the exhaustion process. During or after the dyeing process which, advantageously, is promoted by the addition of neutral salts such as sodium sulfate or sodium chloride, the dyestuff is fixed by treatment with acid-binding agents. A particularly simple dyeing process consists in adding the total amount of the neutral salts which promote exhaustion and adding the acid-binding agent to the dye bath from the very beginning, introducing the goods to be dyed at low temperatures (25°-40° C.) into the bath, heating the bath gradually to a temperature, depending on the aforementioned starting temperature, in the range of from 40° to 100° C., and continuing treatment at the latter temperature until the fixation of the dyestuff is completed. In this way, dyeings having excellent wet fastness properties and good fastness to light are obtained.

Reactive dyestuffs of formula III wherein Hal is chlorine are fixed at room temperature (about 20° C.) when the bath is strongly alkaline (pH above 11) or, preferably, at elevated temperatures (60° to 160° C.) at lower pH (about 9 to 11) and those in which Hal represents fluorine are fixed under milder conditions, e.g., at lower temperatures (20° to 30° C.) and/or lower pH (8-11), or correspondingly shorter time.

"Wet fastness" properties shown by the dyestuffs according to the first and also by those of the second aspect of this invention, described in detail hereinafter, are, in particular, wash fastness, fastness to water, to sea water, to perspiration, and, in the case of wool dyeings, also fastness to milling and potting. These wet fastness properties are also found in wool dyeings of stronger shades e.g., standard depths 2 to 5).

Moreover, the yield rate of fixed dyestuff to unfixed dyestuff portion on wool is very favorable in the case of dyestuffs of the first as well as of the second aspect of the invention.

In the dyeing of cotton and the like cellulose fibers, the unfixed portion of these dyestuffs remaining on the fibers after fixation, can be very readily removed by washing with hot water or by soaping. Wool dyeings are distinguished by level strike of these dyestuffs irrespective of differences in the type of wool, which level strike is assured especially by the use of anionic or nonionogenic dyestuff carriers or mixtures of such carriers.

Preferably sodium or potassium bicarbonates, sodium or potassium carbonates, sodium metasilicate, trisodium phosphate or sodium hydroxide solution, or the sodium or potassium salt of trichloroacetic acid are used as acid-binding agents. In addition the dye liquor or printing paste can contain further additives, for example salts such as sodium sulfate or chloride already mentioned, or auxiliaries such as acid amides, e.g., urea or additives which prevent reduction such as nitrobenzene sulfonic acid, and also additives which accelerate the reaction, such as tertiary amines, e.g., trimethylamine or 1,4-diaza-bicyclo-(2,2,2)-octane.

Reactive dyestuffs according to the invention which correspond to formula III and which contain no sulfonic acid group are preferably used in fine aqueous dispersion for the dyeing of hydrophobic fibers, in particular for the dyeing of synthetic polyamide fibers such as nylon.

Further details can be seen from the following nonlimitative examples of this aspect of the invention. Where not otherwise expressly stated, parts and percentages are give by weight. The temperatures are in degrees Centigrade. The relationship of parts by weight to parts by volume is as that of grams. (g.) to milliliters (ml.).

EXAMPLE 1

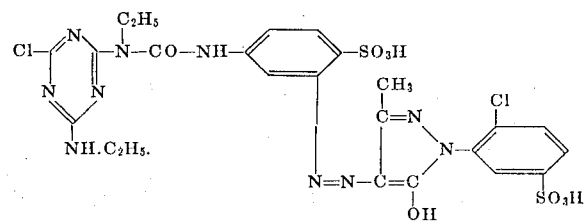

18.8 parts of 1,3-diaminobenzene-4sulfonic acid are dissolved in 400 parts of water with the addition of sodium carbonate to give a pH of 4.0–4.5, and the solution is cooled to 0–5°. 27.7 parts of 2-ethylamino-4-N-chloroformyl-ethylamino-6-chloro-s-triazine dissolved in 100 parts of acetone are added dropwise at this temperature within 15 minutes, the pH of the reaction mixture being maintained at 4.0–4.5 by the simultaneous addition of sodium carbonate solution. As soon as the reaction is completed, 25 parts of aqueous 30 percent hydrochloric acid are added and diazotisation is performed with 6.9 parts of sodium nitrite at 0–5°. The suspension of the diazonium compound is poured into a solution of the sodium salt of 28.9 parts of 1-(2'-chloro-5'-sulphophenyl)-3-methyl-5-pyrazolone in 200 parts of water and 40 parts of sodium acetate. On completion of the coupling, the new dyestuff is precipitated with sodium chloride, filtered off, washed with dilute sodium chloride solution and dried in vacuo at 40°–50°. It is a yellow powder which dissolves in water with a greenish yellow color.

The new dyestuff dyes cotton, staple fiber, jute, ramie, hemp, wool, silk, and nylon by the processes usual for reactive dyestuffs in pure yellow shades which are fast to wet and light.

Dyestuffs having similar properties are obtained when, instead of the 1-(2'-chloro-5'-sulfophenyl)-3-methyl-5-pyrazolone, an equivalent amount of the coupling components given in the following table 1 are used.

Table 1

| Example No. | coupling component | shades are given in parenthesis |
|---|---|---|
| 2. | 1-(2',5'-disulfophenyl)-3-methyl-5-pyrazolone. | (yellow) |
| 3. | 1-[5',7'-disulfonaphthyl-(2')-3-methyl-5-pyrazolone. | (yellow) |
| 4. | 1-(4'-sulfophenyl)-5-pyrazolone-3-carboxylic acid. | (yellow) |
| 5. | 1-(3'-sulfophenyl)-3-methyl-5-pyrazolone. | (yellow) |
| 6. | 1-(2'-fluoro-5'-sulfophenyl)-3-methyl-5-pyrazolone. | (yellow) |
| 7. | 1-chloroacetylamino-8-hydroxynaphthalene-4,6-disulfonic acid. | (red) |
| 8. | 1-(β-bromopropionylamino)-8-hydroxy-naphthalene-3,6-disulfonic acid. | (red) |

EXAMPLE 9

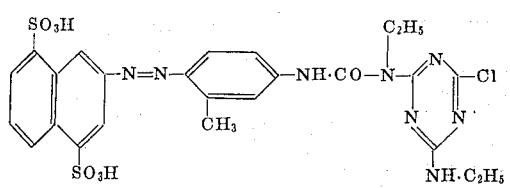

42.1 parts of the aminomonoazo dyestuff of the formula

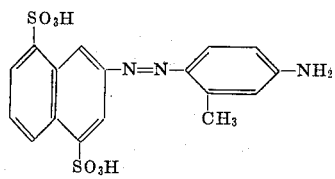

(produced by diazotizing 2-aminonaphthalene-4,8-disulfonic acid and coupling the diazonium compound with 1-amino-3-methylbenzene in the presence of alkali metal salts of fatty acids) are dissolved in the form of the sodium salt in 400 parts of water. 29.1 parts of 2-ethylamino-4-N-chloroformyl-ethylamino-6-chloro-s-triazine dissolved in 100 parts of acetone are added dropwise at 20°–25° within 1 hour, the pH of the reaction mixture being kept at 6.5–7.0 by the simultaneous addition of sodium carbonate solution. As soon as no more free amino groups can be traced, the reaction product is precipitated by the addition of sodium chloride, filtered off and washed with dilute sodium chloride solution. The new dyestuff is dried in vacuo at 40°–50°. It is a yellow powder which dissolves in water with a yellow color. It dyes cellulose and polyamide fibers by the processes usual for reactive dyestuffs in pure yellow shades which have good fastness to wet and light.

Other azo dyestuffs having similar properties are obtained by reacting equivalent amounts of the aminoazo dyestuffs given in the following table 2, in accordance with example 9 with a. 29.1 parts of 2-ethylamino-4-N-chloroformyl ethylamino-6-chloro-s-triazine or with equivalent parts of the reactant indicated in column 3 of the table, namely b. 2-dimethylamino-4-N-chloroformyl-methylamino-6-chloro-s-triazine, c. 2-N-methyl-N-phenylamino-4-N-chloroformyl-methylamino-6-chloro-s-triazine, d. 2-ethylamino-4-N-chloroformyl-ethylamino-6-fluoro-s-triazine, e. 2-(4'-chlorophenoxy)-4-N-chloroformyl-methylamino-6-bromo-s-triazine, or f. 2-propylamino-4-N-chloroformyl-methylamino-6-chloro-s-triazine.

TABLE 2

| Ex. No. | Aminoazo dyestuff | Reactant | Shade on cellulose fibers |
|---|---|---|---|
| 10 | 2-aminonaphthalene-5,7-disulfonic acid→aniline. | a, b, c, d, e, f.. | Yellow. |
| 11 | 2-aminonaphthalene-4,8-disulfonic acid→2-methoxy-5-methyl-aniline. | a, b, c, d, e, f.. | Do. |
| 12 | 2-aminonaphthalene-4,6,8-trisulfonic acid→aniline. | a, b, c, d, e, f.. | Do. |
| 13 | 2-aminonaphthalene-4,6,8-trisulfonic acid→3-methyl-1-aminobenzene→aniline. | a, b, c, d, e, f.. | Orange. |
| 14 | 4-aminoazobenzene-3,4'-disulfonic acid→3-methyl-1-aminobenzene. | a, b, c, d, e, f.. | Do. |
| 15 | 2-aminonaphthalene-4,8-disulfonic acid→N-methyl-aniline. | a, b, c, d, e, f.. | Yellow. |
| 16 | 1-aminobenzene-2,4-disulfonic acid→1-aminonaphthalene-6-sulfonic acid→1-methyl-3-aminobenzene. | a, b, c, d, e, f.. | Orange. |
| 17 | 1-aminobenzene-2,5-disulfonic acid→m-aminophenyl urea. | a, b, c, d, e, f.. | Yellow. |

EXAMPLE 18

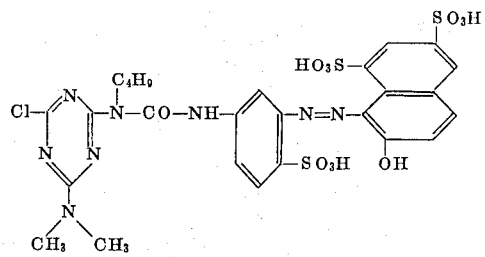

50.3 parts of the aminoazo dyestuff of the formula

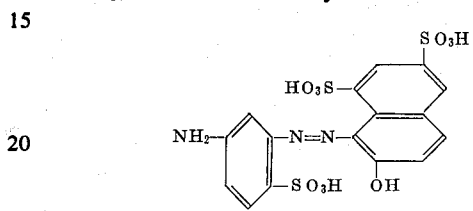

(produced by coupling diazotized 2-amino-4-acetylaminobenzene-1-sulfonic acid with 2-hydroxynaphthalene-6,8-disulfonic acid in an alkaline medium and saponifying the acetylamino group with sodium hydroxide solution, in accordance with the procedure described by Fierz-David and Blangey in "Farbenchemie," 8th edition, pg. 283 et seq.) are dissolved, in the form of the sodium salt, in 800 parts of water with a neutral reaction. 30.6 parts of 2-dimethylamino-4-N-chloroformyl-n-butylamino-6-chloro-s-triazine dissolved in 100 parts of acetone are added at 15°–20° the pH of the reaction mixture being kept at 5–5.5 by the addition dropwise of sodium carbonate solution. As soon as no more diazotizable amino groups can be traced, the dyestuff is completely precipitated by the addition of sodium chloride, filtered off and dried in vacuo at 60°–70°. It dissolves easily in water with an orange color and dyes polyamide and cellulose fibers by the processes usual for reactive dyestuffs in yellowish orange shades.

By reacting the aminoazo dyestuffs listed in the following table 3 according to the procedure described in example 18 with, in each case, a. 2-dimethylamino-4-N-chloroformyl-n-butylamino-6-chloro-s-triazine or with equivalent parts of b. 2-methoxy-4-N-chloroformyl-ethylamino-6-chloro-s-triazine, c. 2-phenoxy-4-N-chloroformyl-methylamino-6-chloro-s-triazine, d. 2-morpholino-4-N-chloroformyl-methylamino-6-bromo-s-triazine, e. 2-(4'-methoxy-phenoxy)-4-N-chloroformyl-ethylamino-6-chloro-s-triazine, f. 2-(4'-chlorophenylamino)-4-N-chloroformyl-methylamino-6-chloro-s-triazine and g. 2-dimethylamino-4-N-chloroformyl-methylamino-6-chloro-s-triazine, respectively valuable dyestuffs are obtained, dyeings of which on cellulose fibers yield the shades given in the last column of table 3 below.

TABLE 3

| Example No. | Aminoazo dyestuffs | Shade on cellulose fibers |
|---|---|---|
| 19 (a to g) | 2-amino-4-nitrobenzene sulphonic acid→1-acetylamino-8-hydroxynaphthalene-3,6-disulphonic acid, reduced. | Red. |
| 20 (a to g) | 2-amino-4-nitrobenzene sulphonic acid→1-benzoylamino-8-hydroxynaphthalene-3,6-disulphonic acid, reduced. | Red. |
| 21 (a to g) | 2-amino-4-acetylaminobenzene sulphonic acid→1-hydroxynaphthalene-3,6-disulphonic acid, saponified. | Orange. |
| 22 (a to g) | 2-amino-4-acetylaminobenzene sulphonic acid→1-hydroxynaphthalene-4,6-disulphonic acid, saponified. | Red-orange. |

TABLE 3—Continued

| Example No. | Aminoazo dyestuffs | Shade on cellulose fibers |
|---|---|---|
| 23 (a to g) | 1-aminobenzene-2,5-disulphonic acid alkaline →  2-amino-5-hydroxynapthalene-7-sulphonic acid. | Orange. |
| 24 (a to g) | 2-aminonaphthalene-1,5-disulphonic acid alkaline 2-methylamino-5-hydroxynaph- → thalene-7-sulphonic. | Reddish orange. |
| 25 (a to g) | 1-aminobenzene-2,4-disulphonic acid→1-(3'-aminobenzoylamino)-8-hydroxynaphthalene-3,6-disulphonic acid. | Red. |
| 26 (a to g) | 2-amino-4-acetylaminobenzene sulphonic acid→2-aminonaphthalene-5,7-disulphonic acid saponified. | Orange. |
| 27 (a to g) | 2-amino-4-acetylaminobenzene sulphonic acid→1-(3'-sulphophenyl)-3-methyl-5-pyrazolone, saponified. | Yellow. |
| 28 (a to g) | 2-amino-5-nitrobenzene sulphonic acid→1-(3'-sulphophenyl)-3-methyl-5-pyrazole imine, reduced. | Do. |
| 29 (a to g) | 1-amino-3-nitro-6-ethylbenzene→1-hydroxy-naphthalene-3,6-disulfonic acid, reduced. | Reddish orange. |
| 30 (a to g) | 1-amino-3-N-methylsulfamylbenzene→1-amino-8-hydroxynaphthalene-3,6-disulfonic acid. | Red. |
| 31 (a to g) | 1-aminobenzene-3-N-(γ-hydroxypropyl)-N-methylsulfonamide→1-amino-8-hydroxy-naphthalene-3,6-disulfonic acid. | Red. |
| 32 (a to g) | 4-amino-3-carboxy-benzene-sulfonic acid→2-amino-5-hydroxynaphthalene-7-sulfonic acid. | Orange. |
| 33 (a to g) | 1-aminobenzene-3-N-(β-hydroxyethyl)-N-methylsulfonamide→1-amino-8-hydroxy-naphthalene-4,6-disulfonic acid. | Red. |
| 34 (a to g) | 3-amino-4-ethoxybenzene-sulfonic acid → 2-amino-5-hydroxynaphthalene-7-sulfonic acid. | Orange. |
| 35 (a to g) | 1-aminobenzene-3-N-(β-sulfoethyl)-N-methylsulfonomaide→1-amino-8-hydroxy-naphthalene-3,6-disulfonic acid. | Red. |
| 36 (a to g) | 2-aminonaphthalene-4,6,8-trisulfonic acid→1-(4'-aminophenyl)-3-methyl-5-pyrazolone. | Yellow. |
| 37 (a to g) | 1-amino-3-N,N-bis-(γ-hydroxypropyl)-sul-famyl-benzene→1-amino-8-hydroxy-naphthalene-3,6-disulfonic acid. | Red. Red. |
| 38 (a to g) | 2,3'-diamino-diphenyl-1,1'-disulfimide→1-amino-8-hydroxynaphthalene-3,6-disulfonic acid. | Red. |
| 39 (a to g) | 2-aminonaphthalene-1,5,7-trisulfonic acid→2-amino-5-hydroxynaphthalene-7-sulfonic acid→1-amino-3-methylbenzene. | Red. |
| 40 (a to g) | 2-amino-4-nitrobenzene sulfonic acid→1-benzoylamino-8-hydroxynaphthalene-4, disulfonic acid, reduced. | Red. |

As used in the above Table 3 and subsequent tables, "alkaline" means that the coupling was carried out in a conventional manner at a pH above 7, "saponified" means that the coupled product was treated as described in example 18, supra, and "reduced" means that the coupling product was treated as described in example 40h, infra.

EXAMPLE 40h

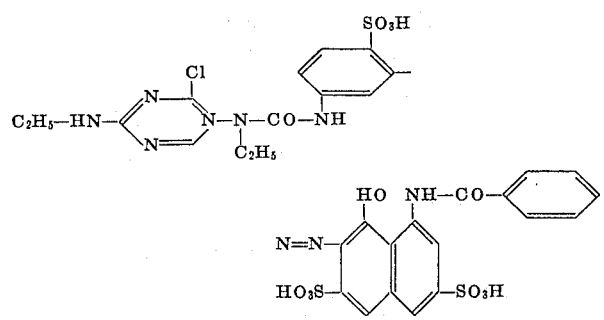

62.2 parts of the sodium salt of the aminoazo dyestuff of the formula

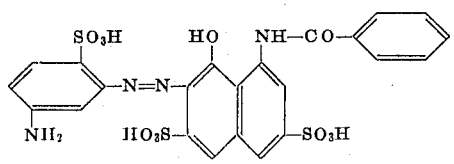

(obtained by coupling diazotized 2-amino-4-nitrobenzene sulfonic acid with 1-benzoylamino-8-hydroxynaphthalene-3,6-disulfonic acid in a neutral medium and reducing the nitroazo dyestuff with sodium sulfide in alkaline medium of pH about 10–12) are dissolved in 500 parts of water. At 15°–20°, 29.0 parts of 2-ethylamino-4-N-chloroformyl-ethylamino-6-chloro-s-triazine dissolved in 100 parts of acetone are added dropwise, the pH of the reaction solution being kept at 5.0–5.5 by the addition of sodium carbonate solution. As soon as no more free amino groups can be detected, the dyestuff is completely precipitated by the addition of sodium chloride, filtered off and dried in vacuo at 60°–70°. It dissolves easily in water with a red color and dyes cellulose and polyamide fibers by processes usual for reactive dyestuffs in pure red shades.

EXAMPLE 41

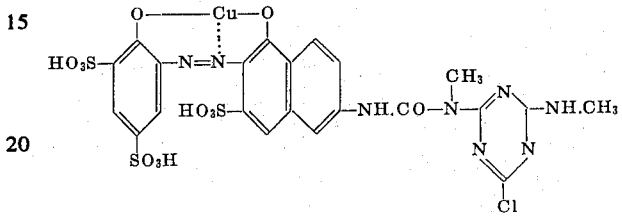

51.7 parts of the copper containing aminomonoazo dyestuff of the formula

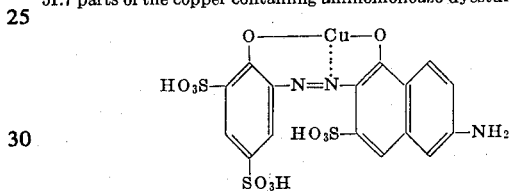

(obtained by coupling diazotised 2-amino-1-hydroxybenzene-4,6disulfonic acid with 2-amino-5-hydroxynaphthalene-7sulfonic acid in an alkaline medium and treating the aminomonoazo dyestuff obtained with an agent giving off copper) are dissolved, in the form of the sodium salt, in 1,000 parts of water. At 0°–10°, a solution of 27.6 parts of 2-methylamino-4-N-chloroformyl-methyl-amino-6-chloro-s-triazine in 150 parts of acetone is added and the pH of the reaction solution is maintained at 5.5–6.0 by the addition of sodium carbonate solution. As soon as no more free amino groups can be traced, the new dyestuff is completely precipitated by the addition of sodium chloride, filtered off and dried in vacuo at 40°50°. It is a dark powder which dissolves in water with a ruby red color.

It dyes cotton, staple fiber, jute, ramie, hemp, wool, silk and nylon by the processes usual for reactive dyestuffs in pure ruby red shades which are wet fast.

Further metal-containing aminoazo dyestuffs are given in the following table 4 which are reacted as described in this example with a. 2-methylamino-4-N-chloroformyl-methylamino-6-chloro-s-triazine or with equivalent parts of b. 2-ethylamino-4-N-chloroformyl-ethylamino-6-chloro-s-triazine, c. 2-ethoxy-4-N-chloroformyl-methylamino-6-chloro-s-triazine, d. 2-phenylthio-4-N-chloroformyl-methylamino-6-chloro-s-triazine, e. 2-amylamino-4-N-chloroformyl-butylamino-6-bromo-s-triazine and f. 2-(4'-methylphenylthio)-4-N-chloroformyl-methylamino-6-chloro-s-triazine, respectively. The shades of dyeings with the end products on cellulose fibers are given in the last column of table 4.

TABLE 4

| Example No. | Metal-containing aminoazo dyestuffs | Shade on cellulose fibres |
|---|---|---|
| 42 (a to f) | 2-amino-1-hydroxybenzene-4, 6-disulphonic acid alkaline 1-amino-8-hydroxynaphth- → | Violet. |

TABLE 4 —Continued

| Example No. | Metal-containing aminoazo dyestuffs | Shade on cellulose fibres |
|---|---|---|
| 43 (a to f) | 2-amino-1-hydroxybenzene-4-sulphonic acid-alkaline 2-amino-8-hydroxynaphthalene-6-sulphonic acid, copper complex. | Bordeaux. |
| 44 (a to f) | 6-nitro-1-amino-2-hydroxynaphthalene-4-sulphonic acid alkaline 2-amino-5-hydroxynaphthalene-7-sulphonic acid, chromium complex 1:2. | Black. |
| 45 (a to f) | 4-nitro-2-amino-1-hydroxybenzene alkaline 1-amino-8-hydroxynaphthalene-3, 6-disulphonic acid, chromium complex 1:2. | Do. |
| 46 (a to f) | 4-nitro-2-amino-1-hydroxybenzene alkaline 1-amino-8-hydroxynaphthalene-3, 6-disulphonic acid, cobalt complex 1:2. | Black-brown. |
| 47 (a to f) | 2-amino-4acetylamino-1-hydroxybenzene-6-sulphonic acid alkaline 1-amino-8-hydroxynaphthalene-2, 4-disulphonic acid, copper complex, saponified. | Reddish navy blue. |
| 48 (a to f) | 2-amino-4-acetylamino-1-hydroxybenzene-6-sulphonic acid alkaline 1-phenylamino-8-hydroxynaphthalene-4, 6-disulphonic acid, copper complex, saponified. | Navy blue. |
| 49 (a to f) | 6-nitro-1-amino-8-hydroxybenzene-4-sulphonic acid alkaline 1-amino-8-hydroxynaphthalene-2, 4-disulpnonic acid, reduced, copper complex. | Blue. |
| 50 (a to f) | 2-amino-6-acetylamino-1-hydroxybenzene-4-sulphonic acid→1-hydroxy naphthalene-4, 6-disulphonic acid, copper complex, saponified. | Ruby red. |
| 51 (a to f) | 2-amino-6-acetylamino-1-hydroxybenzene-4-sulphonic acid→1-(2', 5'-disulphophenyl)-3-methyl-5-pyrazolone, copper complex, saponified. | Yellow brown. |
| 52 (a to f) | 1-hydroxy-2-amino-5-methylsulfonyl benzene→2-amino-8-hydroxynaphthalene-3, 6-disulfonic acid, copper complex. | Ruby. |
| 53 (a to f) | 3-amino-4-hydroxy-benzolsulfonic acid→N-(3'-aminophenyl)-acetoacetic acid amide 1:2-cobalt complex. | Yellow. |
| 54 (a to f) | 3-hydroxy-4-amino-bromobenzol→1-amino-8-hydroxynaphthalene-3, 6-disulfonic acid, copper complex. | Violet. |
| 55 (a to f) | 1-hydroxy-2-amino-benzene-5-N-(β-methoxy-ethyl-N-amylsulfonamide→2-amino-8-hydroxynaphthalene-3, 6-disulfonic acid, copper complex. | Ruby. |

EXAMPLE 56

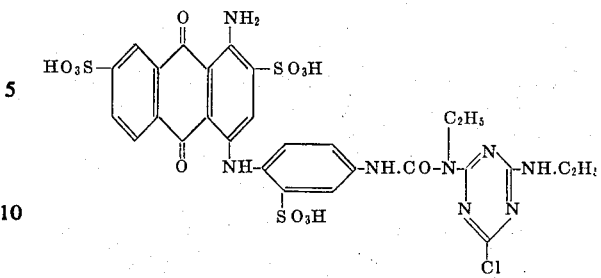

56.9 parts of 1-amino-4-(4'-aminophenylamino)-anthraquinone-2,2',7'-trisulfonic acid (obtained by sulfonation of 1-amino-4-(4'-aminophenylamino)-anthraquinone-2,7-disulfonic acid in 30 percent oleum) are dissolved, in the form of the sodium salt, in 1,000 parts of water. A solution of 27.7 parts of 2-ethylamino-4-N-chloroformyl-ethylamino-6-chloro-s-triazine in 100 parts of acetone is added to this solution dropwise at 20°–25° and the pH is maintained at 5.0–5.5 by the simultaneous addition of aqueous sodium carbonate solution. On completion of the reaction, the new dyestuff of the above formula is precipitated by the addition of sodium chloride, filtered off, washed with aqueous sodium chloride solution and dried in vacuo at 40°–50°. It dissolves in water with a blue color and dyes cotton, staple fiber, jute, ramie, hemp, wool, silk and nylon by the processes usual for reactive dyestuffs in wet-fast blue shades.

Other aminoanthraquinone dyestuffs listed in the following table 5 are condensed as described in example 56 with a. 2-ethylamino-4-N-chloroformyl-ethylamino-6-chloro-s-triazine or with equivalent parts of b. 2-methylthio-4-N-chloroformyl-methylamino-6-chloro-s-triazine, c. 2-diethylamino-4-N-chloroformyl-methylamino-6-chloro-s-triazine, d. 2-N-methyl-N-(4'-chlorphenylamino)-4-N-chloroformyl-butylamino-6-chloro-s-triazine, e. 2-N-methyl-N-(4'-ethoxyphenylamino)-and f. 2-phenylamino-4-N-chloroformyl-ethylamino-6-chloro-s-triazine, respectively. The shade of the cellulose dyeings obtained with the resulting reactive dyestuffs is given in the last column of table 5.

TABLE 5

| Example No. | Aminoanthraquinone dyestuff | Shade on cellulose fibres |
|---|---|---|
| 57 | (structure shown) | Blue. |
| 58 | (structure shown) | Do. |
| 59 | (structure shown) | Do. |

TABLE 5 — Continued

| Example No. | Aminoanthraquinone dyestuff | Shade on cellulose fibres |
|---|---|---|
| 60 | (structure shown) | Do. |
| 61 | (structure shown) | Do. |

EXAMPLE 62

57.6 parts of copper phthalocyanine tetrasulfonic acid chloride are slurried in 500 parts of water and 300 parts of ice. Fifteen parts of m-aminoacetanilide are stirred in and the pH is adjusted to 7 by the addition of aqueous ammonia solution. The temperature is allowed to rise slowly to 40°–50°, the pH of the suspension being maintained at 7.0–7.5 by the dropwise addition of ammonia solution. As soon as no more primary amine can be traced, 270 parts of 30 percent hydrochloric acid are added and the mixture is heated for 3 hours at 85°–90°. In this way the acetyl-amino group is saponified.

The amino-phthalocyanine dyestuff of the formula

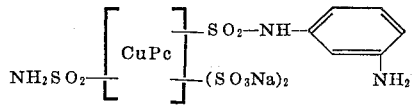

wherein Pc represents the phthalocyanine structure is so obtained.

This dyestuff is then isolated by filtration, again slurried in 1,000 parts of 0°–5° cold water and the pH of the suspension is adjusted to 8.0 with dilute sodium hydroxide solution. A solution of 27.7 parts of 2-ethylamino-4-N-chloroformyl-ethyl-amino-6-chloro-s-triazine in 100 parts of acetone is poured into this suspension. Condensation is performed at 15°–20° while stirring well and the hydrochloric acid liberated is neutralized by the dropwise addition of dilute sodium carbonate solution. On completion of the reaction, the new dyestuff is completely salted out, filtered off and dried in vacuo at 50°–60°. It corresponds to the formula

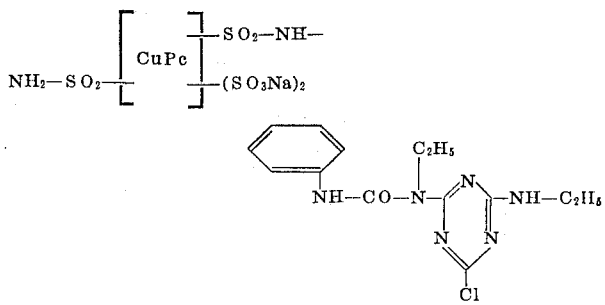

wherein Pc represents the phthalocyanine structure.

It dyes cellulose or polyamide fibers in wet-fast, pure turquoise blue shades.

Other amino-phthalocyanine dyestuffs which are given in the following table 6, are condensed as described in example 62 with a. 2-ethylamino-4-N-chloroformyl-ethylamino-6-chloro-s-triazine, or with equivalent parts of
b. 2-piperidino-4-N-chloroformyl-methylamino-6-chloro-s-triazine,
c. 2-dimethylamino-4-N-chloroformyl-ethyl-amino-6-chloro-s-triazine,
d. 2-dibutylamino-4-N-chloroformyl-methyl-amino-6-chloro-s-triazine,
e. 2-(4'-methylphenylamino)-4-N-chloroformyl-methylamino-6-chloro-s-triazine, and
f. 2-N-methyl-N-(4'-methylphenylamino)-4-N-chloroformyl-methylamino-6-bromo-s-triazine, respectively.

TABLE 6

| Example No. | Amino-phthalocyanine dyestuff | Shade on cellulose fiber |
|---|---|---|
| 63 (a–f) | CuPc[—(SO₃H)₃][—SO₂—NH—(CH₂)₂—NH₂] | Turquoise blue. |
| 64 (a–f) | CuPc[—(SO₂—NH₂)₃][—SO₂—NH—C₆H₃(SO₃H)(NH₂)] | Do. |

EXAMPLE 65

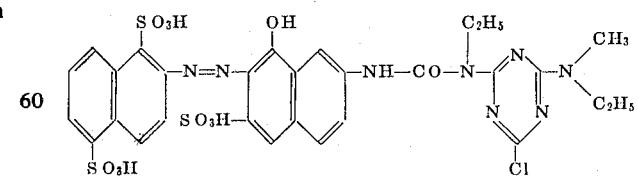

23.9 parts of 2-amino-8-hydroxynaphthalene-6-sulfonic acid are dissolved in 400 parts of 15°–20° warm water and the pH is adjusted to 6.5 with sodium hydroxide solution. A solution of 30.6 parts of 2-N-methyl-N-ethylamino-4-N-chloroformyl-ethyl-amino-6-chloro-s-triazine in 100 parts of acetone is added dropwise to this solution within 15 minutes and the pH of the reaction mixture is kept at 4.5–5.5 by the addition of sodium carbonate solution. When no more diazotisable amino groups can be traced, 30 parts of sodium bicarbonate are added to the solution and then a solution of 30.3 parts of diazotised 2-aminoaphthalene-1,5-disulfonic at acid is poured in. As soon as the coupling is complete, sodium chloride is added to the reaction mixture, the precipitated dyestuff is filtered off and washed with sodium chloride solution. After drying at 60°–70°, a red powder is obtained which dissolves easily in water with a red color.

If cotton or staple fiber is dyed or printed, by the processes usual for reactive dyestuffs, with this dyestuff then red dyeings or prints are obtained which have very good properties.

Other dyestuffs having similar properties are obtained if the coupling components containing acylatable amino groups given in the following table are condensed as described in example 65 with a. 2-N-methyl-N-ethylamino-4-N-chloroformyl-ethylamino-6-chloro-s-triazine, or with equivalent parts of b. 2-ethylamino-4-N-chloroformyl-ethylamino-6-fluoro-s-triazine, and coupled with the diazo components also given in the table 7.

parts of sodium nitrite. The suspension of the diazonium compound is poured into a solution of the sodium salt of 28.9 parts of 1-(2'-chloro-5'-sulfophenyl) in 200 parts of water and 40 parts of sodium acetate. As soon as the coupling is complete, the pH of the dyestuff solution is raised to 7.0 and the new dyestuff is precipitated by the addition of sodium chloride. Also, 19.5 parts of a mixture of anhydrous primary potassium phosphate and anhydrous secondary sodium phosphate in a weight ratio of 1.8:1.0 are added.

The mixture is stirred for 1 hour and the precipitate is filtered off, washed, and mixed with 11.7 parts of the mixture of anhydrous primary potassium phosphate and anhydrous secondary sodium phosphate mentioned above and dried in vacuo at a temperature under 45°.

The monoazo dyestuff so obtained is a yellow powder which dissolves in water with a greenish yellow color.

The 2-ethylamino-4-N-chloroformyl-ethylamino-6-fluoro-s-triazine used as starting material is obtained by reacting 2,4-

TABLE 7

| Example No. | Diazo component | Coupling components containing acylatable amino groups | Shade on cotton |
|---|---|---|---|
| 66 (a–b) | 1-aminobenzene-2,5-disulphonic acid. | 1-amino-8-hydroxynaphthalene-3,6-disulphonic acid. | Red. |
| 67 (a–b) | 2-aminonaphthalene-1,5-disulphonic acid. | do | Bluish red. |
| 68 (a–b) | 1-aminobenzene-2-sulphonic acid. | 1-amino-8-hydroxynaphthalene-4,6-disulphonic acid. | Red. |
| 69 (a–b) | 1-aminobenzene-2,4-disulphonic acid. | 1-(4'-aminophenyl)-3-methyl-5-pyrazolone. | Yellow. |
| 70 (a–b) | 1-aminobenzene-2,5-disulphonic acid. | 2-amino-5-hydroxynaphthalene-7-sulphonic acid. | Orange. |
| 71 (a–b) | 4-aminoazobenzene-3,4'-disulphonic acid. | 2-methylamino-5-hydroxynaphthalene-7-sulphonic acid. | Scarlet. |
| 72 (a–b) | 2-aminonaphthalene-1,5-disulphonic acid. | 1-amino-8-hydroxynaphthalene-4,6-disulphonic acid. | Bluish red. |

EXAMPLE 73

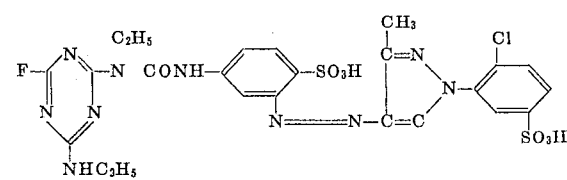

18.8 parts of 1,3-diaminobenzene-4-sulfonic acid are dissolved in 400 parts of water and the pH is adjusted to 4.0–4.5 with sodium carbonate. Twenty-six parts of 2-ethylamino-4-N-chloroformyl-ethylamino-6-fluoro-s-triazine dissolved in 100 parts of acetone and an aqueous sodium carbonate solution are added simultaneously to this solution within 15 minutes at 0°–5° in such a way that the pH of the reaction mixture remains between 4.0 and 4.5. On completion of the reaction, 25 parts of 30 percent hydrochloric acid are added to the condensation product which is then diazotised at 0°–5° with 6.9 bis-ethylamino-6-chloro-s-triazine with potassium fluoride in dimethyl formamide to form 2,4-bis-ethylamino-6-fluoro-s-triazine and treating the latter according to known methods with phosgene in toluene.

By padding cotton at room temperature with a 2 percent aqueous solution of this dyestuff which also contains 20 parts of sodium carbonate and 50 parts of sodium sulfate per liter, rolling up the impregnated goods, wrapping in a plastic cover and keeping for 4 hours at 25°–30° and finally soaping at the boil for 30 minutes, then a yellow dyeing is obtained which has very good fastness to washing and light.

Dyestuffs having similar properties are obtained, in accordance with the preceding example, by condensing the diaminobenzene sulfonic acid compounds given in column II of the following table 8 with equivalent parts of the acylating agents given in column III of said table; the condensation products are then diazotized and the resulting diazonium compounds are finally coupled with the coupling components listed in column IV. The shade on cellulose fibers obtained with the final products is given in the last column of table 8.

TABLE 8

| Ex. No. | II Diaminobenzene sulphonic acid compound | III Acylating agent | IV Coupling component | V Shade on cellulose fibres |
|---|---|---|---|---|
| 74 | 1,3-diaminobenzene-4-sulphonic acid. | F–N=, N–NHC₂H₅, N–COCl, C₂H₅ (triazine structure) | 1-(2',5'-disulphophenyl)-3-methyl-5-pyrazolone | Yellow. |
| 75 | do | Same as above | 1-(2',5'-dichloro-4'-sulphophenyl-3-methyl-5-pyrazolone. | Do. |
| 76 | do | do | 1-(3'-sulphophenyl)-3-methyl-5-pyrazolone | Do. |
| 77 | do | do | 1-[5',7'-disulphonaphthyl-(2')]-3-methyl-5-pyrazolone. | Do. |
| 78 | do | do | 1-[4',8'-disulphonaphthyl-(2')-3-methyl-5-pyrazolone. | Do. |
| 79 | do | do | 1-(4'-sulphophenyl)-5-pyrazolone-3-carboxylic acid | Do. |
| 79 | do | do | 1-(4'-sulphophenyl)-5-pyrazolone-3-carboxylic acid | Do. |
| 80 | 1,4-diaminobenzene-3-sulphonic acid. | do | do | Do. |
| 81 | do | 2-dimethylamino-4-N-chloroformylmethylamino-6-fluoro-s-triazine. | do | Do. |
| 82 | 1,3-diaminobenzene-4-sulfonic acid. | do | do | Do. |
| 83 | do | 2-propylamino-4-N-chloroformylmethylamino-6-fluoro-s-triazine. | 1-(2',5'-disulfophenyl)-3-methyl-5-pyrazolone | Do. |

TABLE 8—Continued

| Ex. No. | II Diaminobenzene sulphonic acid compound | III Acylating agent | IV Coupling component | V Shade on cellulose fibres |
|---|---|---|---|---|
| 84 | do | 2-ethylthio-4-N-chloroformylbutylamino-6-fluoro-s-triazine. | 1-(2',5'-dichloro-4'-sulfophenyl)-3-methyl-5-pyrazolone. | Do. |
| 85 | do | 2-methoxy-4-N-chloroformylmethylamino-6-fluoro-s-triazine. | 1-(3'-sulfophenyl)-3-methyl-5-pyrazolone. | Do. |
| 86 | do | 2-phenoxy-4-N-chloroformylmethylamino-6-fluoro-s-triazine. | 1-[5',7'-disulfonaphthyl-(2')]-3-methyl-5-pyrazolone. | Do. |
| 87 | do | 2-ethoxy-4-N-chloroformylethylamino-6-fluoro-s-triazine. | 1-[4',8'-disulfonaphthyl-(2')]-3-methyl-5-pyrazolone. | Do. |
| 88 | do | 2-amylamino-4-N-chloroformylmethylamino-6-fluoro-s-triazine. | 1-(4'-sulfophenyl)-5-pyrazolone-3-carboxylic acid. | Do. |
| 89 | do | 2-dibutylamino-4-N-chloroformylmethylamino-6-fluoro-s-triazine. | 1-(2'-fluoro-5'-sulfophenyl)-3-methyl-5-pyrazolone. | Do. |
| 90 | do | 2-phenylamino-4-N-chloroformylmethylamino-6-fluoro-s-triazine. | 1-chloroacetylamino-8-hydroxynaphthalene-3,6-disulfonic acid. | Red. |
| 91 | do | 2-N-methyl-N-ethylamino-4-N-chloroformylmethylamino-6-fluoro-s-triazine. | 2-(β-bromopropionylamino)-8-hydroxynaphthalene-3,6-disulfonic acid. | Scarlet. |

EXAMPLE 92

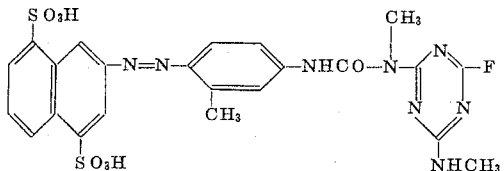

42.1 parts of the sodium salt of the aminoazo dyestuff obtained by coupling of diazotized 2-aminonaphthalene-4,8-disulfonic acid with 1-amino-3-methylbenzene are dissolved in 400 parts of water and the solution is cooled to 0°–5°. 24.2 parts of 2-methylamino-4-N-chloroformyl-methylamino-6-fluoro-s-triazine dissolved in 100 parts of acetone are added dropwise to the solution within 30 minutes at this temperature and the pH of the reaction mixture is kept at 6.5–7.0 by the simultaneous addition of sodium carbonate solution. As soon as no more free amino groups can be traced, a solution of 40 parts of a mixture of primary potassium phosphate and secondary sodium phosphate (weight ratio 1.8:1) in 200 parts of water is added to the reaction mixture. The new dyestuff is precipitated by the addition of sodium chloride, after stirring for 30 minutes it is filtered off and washed with dilute sodium chloride solution. The filter residue is mixed with 12 parts of a mixture of anhydrous primary potassium phosphate and anhydrous secondary sodium phosphate (ratio 1.8:1) and dried in vacuo at a temperature under 45°. After drying, the dyestuff is a yellow powder which dissolves in water with a yellow color.

Four parts of the new dyestuff are dissolved in 1,000 parts of water and 20 parts of sodium carbonate are added. One-hundred parts of cotton are entered at 20° and the bath is heated to 40° within 30 minutes, 80 parts of sodium chloride are added to the solution and the goods are dyed for 1 hour at this temperature. The dyeing is then rinsed and soaped at the boil for 15 minutes. A deep yellow dyeing is obtained which has good fastness to water and light.

Other azo dyestuffs having similar properties are obtained by reacting the aminoazo dyestuffs given in the following table 9 in the manner described in example 92, with a. 2-methylamino-4-N-chloroformyl-methylamino-6-fluoro-s-triazine, or with equivalent parts of b. 2-dimethylamino-4-N-chloroformyl-methylamino-6-fluoro-s-triazine, c. 2-ethylamino-4-N-chloroformyl-n-butylamino-6-fluoro-s-triazine, or d. 2-N-methyl-N-phenylamino-4-N-chloroformyl-methylamino-6-fluoro-s-triazine.

TABLE 9

| Example Number | Aminoazo dyestuff | Shade on cellulose fibres |
|---|---|---|
| 93. (a–d) | 2-aminonaphthalene-5,7-disulphonic acid→1-aminobenzene. | Yellow. |
| 94. (a–d) | 2-aminonaphthalene-4,8-disulphonic acid→1-amino-2-methoxy-5-methylbenzene. | Do. |
| 95. (a–d) | 2-aminonaphthalene-6,8-disulphonic acid→1-amino-3-methoxybenzene. | Do. |
| 96. (a–d) | 2-aminonaphthalene-4,8-disulphonic acid→1-N-methylaminobenzene. | Do. |
| 97. (a–d) | 2-aminonaphthalene-4,6,8-trisulphonic acid→1-aminobenzene. | Do. |
| 98. (a–d) | 2-aminonaphthalene-4,6,8-trisulphonic acid→1-amino-3-methylbenzene→1-aminobenzene. | Orange. |
| 99. (a–d) | 4-aminoazobenzene-3,4'-disulphonic acid→1-amino-3-methylbenzene. | Do. |
| 100. (a–d) | 2-aminonaphthalene-4,8-disulphonic acid→1-amino-naphthalene-6-sulfonic acid→1-methyl-3-amino-benzene. | Do. |
| 101. (a–d) | 1-aminobenzene-2,5-disulfonic acid→(3-aminophenyl)-urea. | Yellow. |

EXAMPLE 102

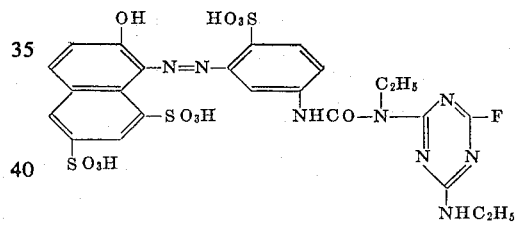

50.3 parts of the sodium salt of the aminoazo dyestuff of the formula (obtained by coupling diazotised 2-amino-4-acetylaminobenzene sulfonic acid with 2-hydroxynaphthalene-6,8-disulfonic acid in an alkaline medium and saponifying the acetylamino group with sodium hydroxide solution) are dissolved with a neutral reaction in 800 parts of water. Twenty-six parts of 2-ethylamino-4-N-chloroformyl-ethylamino-6-fluoro-s-triazine dissolved in 100 parts of acetone are added to this solution at 0–5°, the pH of the reaction solution being kept at 5–5.5 by the dropwise addition of sodium carbonate solution. When no more diazotisable amino groups can be traced, the dyestuff is completely precipitated by the addition of sodium chloride, isolated, stabilized with buffer salts and dried in vacuo at 40°. It dissolves easily in water with an orange color.

If cotton or staple fiber is printed by one of the usual methods with a printing paste consisting of 30 parts of this dyestuff, 200 parts of urea, 400 parts of water, 350 parts of 5 percent aqueous sodium alginate solution and 20 parts of potassium carbonate, then dried, steamed for 10–15 minutes, then rinsed and finally soaped at the boil, an excellent wash-fast orange print is obtained.

By reacting equivalent amounts of the aminoazo dyestuffs listed in the following table 10, in accordance with the procedure described in example 102, with
a. 26 parts of 2-ethyl-amino-4-N-chloroformyl-ethyl-amino-6-fluoro-s-triazine, or with equivalent parts of
b. 2-dimethylamino-4-N-chloroformyl-n-butylamino-6-fluoro-s-triazine,
c. 2-N-methyl-N-phenylamino-4-N-chloroformyl-ethylamino-6-fluoro-s-triazine,
d. 2-dimethylamino-4-N-chloroformyl-isopropylamino-6-fluoro-s-triazine,
e. 2-(4'-chlorophenylamino)-4-N-chloroformyl-methylamino-6-fluoro-s-triazine,
f. 2-(4'-methylphenylamino)-4-N-chloroformyl-methylamino-6-fluoro-s-triazine, or
g. 2-N-methyl-N-(4'-methylphenylamino)-4-N-chloro-formyl-methylamino-6-fluoro-s-triazine, dyestuffs having similar properties, the shades on cellulose fibers of which are given in the following table 10, are produced.

TABLE 10

| Example No. | Aminoazo dyestuff | Shade on cellulose fibres |
|---|---|---|
| 103 (a–g) | 2-amino-4-nitrobenzene sulphonic acid→1-benzoylamino-8-hydroxynaphthalene-4,6-disulphonic acid, reduced. | Red. |
| 104 (a–g) | 2-amino-4-nitrobenzene sulphonic acid→1-acetylamino-8-hydroxynaphthalene-3,6-disulphonic acid, reduced. | Red. |
| 105 (a–g) | 2-amino-4-nitrobenzene sulphonic acid→1-benzoylamino-8-hydroxynaphthalene-3,6-disulphonic acid, reduced. | Red. |
| 106 (a–g) | 2-amino-4-acetylaminobenzene sulphonic acid→1-hydroxynaphthalene-3,6-disulphonic acid, saponified. | Orange. |
| 107 (a–g) | 2-amino-4-acetylaminobenzene sulphonic acid→1-hydroxynaphthalene-4,6-disulphonic acid, saponified. | Red-orange. |
| 108 (a–g) | 1-aminobenzene-2,4-disulphonic acid alkaline → 2-amino-5-hydroxynaphthalene-7-sulphonic acid. | Orange. |
| 109 (a–g) | 2-aminonaphthalene-1,5-disulphonic acid alkaline 2-methylamino-5-hydroxy- → naphthalene-7-sulphonic acid. | Reddish orange. |
| 110 (a–g) | 1-aminobenzene-2-sulphonic acid→1-(3'-amino-benzoylamino)-8-hydroxynaphthalene-3,6-disulphonic acid. | Red. |
| 111 (a–g) | 2-amino-4-acetylaminobenzene sulphonic acid→2-aminonaphthalene-5,7-disulphonic acid, saponified. | Orange. |
| 112 (a–g) | 2-amino-4-acetylaminobenzene sulphonic acid→1-(3'-sulphophenyl)-3-methyl-5-pyrazole imine, saponified. | Yellow. |
| 113 (a–g) | 1-amino-3-nitro-6-ethylbenzene→1-hydroxy-naphthalene-3,6-disulfonic acid, reduced. | Reddish orange. |
| 114 (a–g) | 1-aminobenzene-3-N-methylsulfamide→1-amino-8-hydroxynaphthalene-3,6-disulfonic acid. | Red. |
| 115 (a–g) | 1-aminobenzene-3-N-(γ-hydroxypropyl)-N-methylsulfonamide→1-amino-8-hydroxynaphthalene-3,6-disulfonic acid. | Red. |
| 116 (a–g) | 4-amino-3-carboxy-benzene sulfonic acid→2-amino-5-hydroxy-7-sulfonic acid. | Orange. |
| 117 (a–g) | 1-aminobenzene-3-N-(β-hydroxyethyl)-N-methylsulfonamide→1-amino-8-hydroxynaphthalene-4,6-disulfonic acid. | Red. |
| 118 (a–g) | 3-amino-4-ethoxybenzene-sulfonic acid→2-amino-5-hydroxynaphthalene-7-sulfonic acid. | Orange. |
| 119 (a–g) | 1-aminobenzene-3-N-(β-sulfoethyl)-N-methylsulfonamide→1-amino-8-hydroxynaphthalene-3,6-disulfonic acid. | Red. |
| 120 (a–g) | 2-aminonaphthalene-4,6,8-trisulfonic acid→1-(4'-aminophenyl)-3-methyl-5-pyrazolone. | Yellow. |
| 121 (a–g) | 1-aminobenzene-3-N,N-bis-(γ-hydroxypropyl)-sulfonamide→1-amino-8-hydroxynaphthalene-3,6-disulfonic acid. | Red. |
| 122 (a–g) | 2,3'-diamino-diphenyl-1,1'-disulfimide→1-benzoyl-amino-8-hydroxynapthalene-3,6-disulfonic acid. | Red. |
| 123 (a–g) | 2-aminonaphthalene-1,5,7-trisulfonic acid→2-amino-5-hydroxynaphthalene-7-sulfonic acid→1-amino-3-methylbenzene. | Red. |

EXAMPLE 124

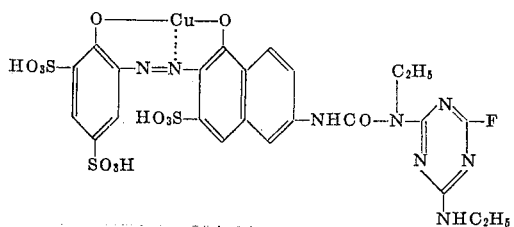

51.7 parts of the sodium salt of the copper-containing aminomonoazo dyestuff of the formula

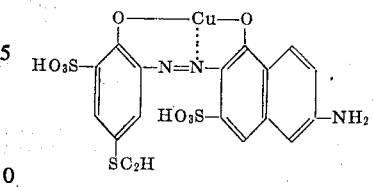

(obtained by coupling diazotized 2-amino-1-hydroxybenzene-4,6-disulfonic acid with 2-amino-5-hydroxnaphthalene-7-sulfonic acid in an alkaline medium and treating the aminomonoazo dyestuff obtained with an agent giving off copper) are dissolved in 1,000 parts of water. At 0°–5°, a solution of 27.2 parts of 2-ethylamino-4-N-chloroformyl-ethylamino-6-fluoro-s-triazine in 100 parts of acetone is added and the pH of the reaction solution is kept at 5–5.6 by the addition of sodium carbonate solution. When no more free amino groups can be traced, the new dyestuff is completely precipitated by the addition of sodium chloride, buffer salts are added and the dyestuff is isolated and dried in vacuo at 40°. The dark powder dissolves in water with a ruby red color.

If cotton is padded with a 2 percent solution of this dyestuff which also contains 2 percent of sodium bicarbonate, the impregnated goods are stored for 4 hours at room temperature, then soaped at the boil, and rinsed, a ruby red dyeing is obtained which has very good wet and light fastness properties.

Other metal-containing aminoazo dyestuffs are given in the following table 11, which are reacted as described in example 124 with a. 2-ethylamino-4-N-chloroformyl-ethylamino-6-fluoro-s-triazine, or with equivalent amounts of b. 2-N-methyl-N-ethylamino-4-N-chloroformyl-ethylamino-6-fluoro-s-triazine, or c. 2-dimethylamino-4-N-chloroformyl-methylamino-6-fluoro-s-triazine.

TABLE 11

| Example No. | Metal-containing aminoazo dyestuffs | Shade on cellulose fibres |
|---|---|---|
| 125 (a–c) | 2-amino-1-hydroxybenzene-4-sulphonic acid alkaline 1-amino-8-hydroxynaphthalene-3, → 6-disulphonic acid, copper complex. | Violet. |
| 126 (a–c) | 2-amino-1-hydroxybenzene-4-sulphonic acid alkaline 2-amino-8-hydroxynaphthalene-6- → sulphonic acid, copper complex. | Bordeaux. |
| 127 (a–c) | 2-amino-1-hydroxybenzene-4,6-disulphonic acid alkaline 2-amino-5-hydroxynaphthalene → 7-sulphonic acid, copper complex. | Ruby. |
| 128 (a–c) | 2-amino-1-hydroxybenzene-4-sulphonic acid alkaline 2-N-methylamino-5-hydroxy- → naphthalene-7-sulphonic acid, copper complex. | Do. |
| 129 (a–c) | 6-nitro-1-amino-2-hydroxynaphthalene-4-sulphonic acid alkaline 2-amino-5-hydroxy- → naphthalene-7-sulphonic acid, chromium complex 1:2. | Black. |
| 130 (a–c) | 4-nitro-2-amino-1-hydroxybenzene alkaline → 1-amino-8-hydroxynaphthalene-3,6-disulphonic acid, chromium complex 1:2. | Do. |
| 131 (a–c) | 4-nitro-2-amino-1-hydroxybenzene alkaline → 1-amino-8-hydroxynaphthalene-3,6-disulphonic acid, cobalt complex 1:2. | Black-brown. |
| 132 (a–c) | 2-amino-4-acetylamino-1-hydroxybenzene-6-sulphonic acid alkaline 1-amino-8- → hydroxynaphyhalene-2,4-disulphonic acid, copper complex, saponified. | Reddish navy blue. |
| 133 (a–c) | 2-amino-4-acetylamino-1-hydroxybenzene-6-sulphonic acid alkaline 1-phenylamino-8- → hydroxynaphthalene-4,6-disulphonic acid, copper complex saponified. | Navy blue. |
| 134 (a–c) | 6-nitro-1-amino-2-hydroxynaphthalene-4-sulphonic acid alkaline 1-amino-8-hydroxy- → naphthalene-2-,4-disulphonic acid, reduced, copper complex. | Blue. |

TABLE 11 —Continued

| Example No. | Metal-containing aminoazo dyestuffs | Shade on cellulose fibres |
|---|---|---|
| 135 (a-c) | 2-amino-6-acetylamino-1-hydroxybenzene-4-sulphonic acid→1-hydroxynaphthalene-4,6-disulphonic acid, copper complex, saponified. | Ruby red. |
| 136 (a-c) | 2-amino-6-acetylamino-1-hydroxybenzene-4-sulphonic acid→1-(2',5'-disulphophenyl)-3-methyl-5-pyrazolone, copper complex saponified. | Yellow-brown. |
| 137 (a-c) | 1-hydroxy-2-amino-5-methylsulfonylbenzene→2-amino-8-hydroxynaphthalene-3,6-disulfonic acid, copper complex. | Ruby red. |
| 138 (a-c) | 3-amino-4-hydroxybenzene sulfonic acid→N-(3'-aminophenyl acetyl acetic acid amide, cobalt complex 1:2. | Yellow. |
| 139 (a-c) | 3-hydroxy-4-amino-bromobenzene→1-amino-8-hydroxy-3,6-disulfonic acid, copper complex. | Violet. |
| 140 (a-c) | 1-hydroxy-2-aminobenzene-5-N-(β-methoxyethyl)-N-amylsulfonamide→2-amino-8-hydroxynaphthalene-3,6-disulfonic acid, copper complex. | Ruby red. |

EXAMPLE 141

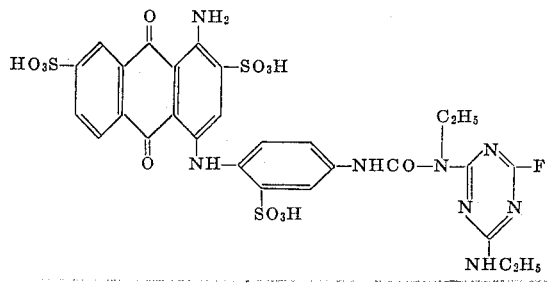

48.9 parts of 1-amino-4-(4'-aminophenylamino)-anthraquinone-2,7-disulfonic acid are added at 20°–25° in 500 parts of 30 percent oleum. The reaction mixture is stirred for 24–36 hours at 20°–25°. The reaction mixture is then poured onto ice and the dyestuff which precipitates of the formula

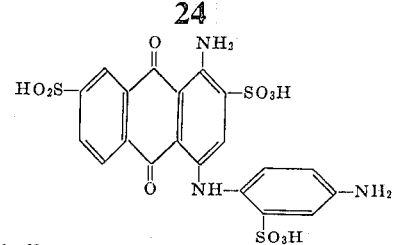

is filtered off.

The filter cake, in the form of the sodium salt, is dissolved in 1,000 parts of water. A solution of 26 parts of 2-ethylamino-4-N-chloroformyl-ethylamino-6-fluoro-s-triazine in 100 parts of acetone is added dropwise to this solution at 0°–10 and the pH is kept at 5–5.5 by the simultaneous addition of sodium carbonate solution. On completion of the condensation, the new dyestuff is precipitated by the addition of sodium chloride, isolated, stabilized with buffer salts and dried in vacuo at 40°. It dissolves in water with a blue color.

If regenerated cellulose is padded with a 2 percent solution of this dyestuff which also contains 10 g. of sodium bicarbonate and 50 g. of urea per liter, the impregnated goods are dried and heated for 2 minutes at 100°–110°, then a pure blue dyeing is obtained which has very good fastness to washing and light.

Other aminoanthraquinone dyestuffs are given in the following table 12 which are condensed as described in example 141 with a. 2-ethylamino-4-N-chloroformyl-ethylamino-6-fluoro-s-triazine, or with equivalent parts of b. 2-diethylamino-4-N-chloroformyl-methylamino-6-fluoro-s-triazine, c. 2-methylamino-4-N-chloroformyl-methylamino-6-fluoro-s-triazine.

d. 2-N-methyl-N-(4'-chlorophenylamino)-4-N-chloroformyl-methylamino-6-fluoro-s-triazine, e. 2-N-methyl-N-(4'-ethoxyphenylamino)-4-N-chloroformyl-methylamino-6-fluoro-s-triazine, or f. 2-phenylthio-4-N-chloroformyl-ethylamino-6-fluoro-s-triazines, whereby reactive dyes of similar properties as those described in the preceding examples are obtained. Cellulose fibers dyed therewith have the shades given in the last column of table 12.

TABLE 12

| Example No. | Aminoanthraquinone dyestuffs | Shade on cellulose fibres |
|---|---|---|
| 142 (a-f) | | Blue. |
| 143 (a-f) | | Do. |
| 144 (a-f) | | Do. |

TABLE 12—Continued

| Example No. | Aminoanthraquinone dyestuffs | Shade on cellulose fibres |
|---|---|---|
| 145 (a-f) | (structure) | Do. |
| 146 (a-f) | (structure) | Do. |
| 147 (a-f) | (structure) | Do. |

EXAMPLE 148

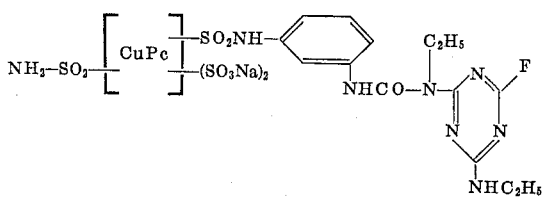

In this formula

Pc represents the phthalocyanine structure.

57.6 parts of copper phthalocyanine are heated for 3 hours at 145° in 270 parts of chlorosulfonic acid. The solution is then cooled to 75° and 33.5 parts of thionyl chloride are added dropwise within 1 hour. The mixture is stirred for 3 hours at 70°–75, then cooled to room temperature and poured onto 1,500 parts of ice. The suspension formed is filtered off and the precipitate is washed with 500 parts of 1 percent hydrochloric acid. The filter cake is then slurried in 500 parts of water and 300 parts of ice, stirred with 15 parts of m-aminoacetanilide and the pH is adjusted to 7 by the addition of aqueous ammonia solution. The temperature is then slowly allowed to rise to 40°–50°, the pH of the suspension always being kept at 7.0–7.5 by the addition dropwise of ammonia solution. As soon as no more primary amine can be traced, 270 parts of 30 percent hydrochloric acid are added. The mixture is heated for 3 hours at 85°–90° and in this way the acetylamino group is saponified.

The amino-phthalocyanine dyestuff of the formula

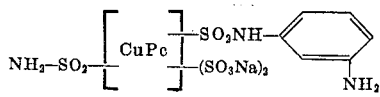

wherein Pc has the meaning given above, is so obtained.

This dyestuff is then isolated by filtration, again slurried in 1,000 parts of water which is 0°–5° cold and the pH of the suspension is adjusted to 8.0 with dilute sodium hydroxide solution. A solution of 26 parts of 2-ethylamino-4-N-chloroformyl-ethylamino-6-fluoro-s-triazine in 100 parts of acetone is poured into this suspension. Condensation is performed at 0°–5° while stirring well and the hydrochloric acid liberated is neutralized by the addition dropwise of dilute sodium carbonate solution. On completion of the reaction, the new dyestuff is completely precipitated by the addition of sodium chloride, isolated in the presence of a buffering agent and dried in vacuo at 40°. It corresponds to the formula given at the beginning of this example.

If cotton is padded at 20° with a 2 percent solution of this dyestuff which also contains 20 parts of sodium bicarbonate and 200 parts of urea per liter, and the impregnated goods are dried, then heated for 4 minutes at 130°–140° and finally soaped at the boil for 30 minutes, then a pure turquoise blue dyeing is obtained which has very good wet and light fastness properties.

Other amino-phthalocyanine dyestuffs are given in the following table 13, which are condensed as described in example 148 with a. 2-ethylamino-4-N-chloroformyl-ethylamino-6-fluoro-s-triazine, or with equivalent parts of b. 2-diethylamino-4-N-chloroformyl-methylamino-6-fluoro-s-triazine, c. 2-methylamino-4-N-chloroformyl-methylamino-6-fluoro-s-triazine, d. 2-(4'-methylphenylthio)-4-N-chloroformyl-methylamino-6-fluoro-s-triazine, e. 2-morpholino-4-N-chloroformyl-methylamino-6-fluoro-s-triazine, or f. 2-piperidino-4-N-chloroformyl-propylamino-6-fluoro-s-triazine.

The resulting reactive dyes have similar good properties as those of the preceding examples, and dyeings produced therewith on cellulosic fibers, e.g., cotton, have the shades given in the last column of table 13.

TABLE 13

| Example Number | Amino-phthalocyanine dyestuff | Shade on cellulose fibres |
|---|---|---|
| 149 a-f | CuPc[—SO₂NH—⟨phenyl⟩—SO₃H ; —(SO₂NH)₃—NH₂] | Turquoise blue. |
| 150 a-f | CuPc[—SO₂NHCH₂CH₂NH₂ ; —(SO₃H)₃] | Do. |
| 151 a-f | CuPc[—SO₂NHCH₂CH₂NH₂ ; —(SO₂NH₂)₃] | Do. |

EXAMPLE 152

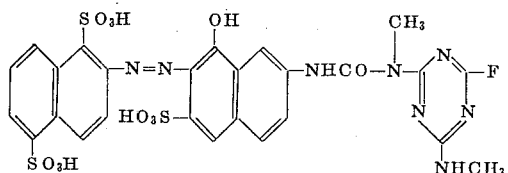

23.9 parts of 2-amino-8-hydroxynaphthalene-6-sulfonic acid are dissolved in 400 parts of water, the pH being adjusted to 6.5 with sodium carbonate, and the solution is cooled to 0°–5°. A solution of 24 parts of 2-methylamino-4-N-chloroformyl-methylamino-6-fluoro-s-triazine in 100 parts of acetate is added dropwise within 15 minutes at this temperature and the pH of the reaction mixture is kept at 4.5–5.5 by the addition of sodium carbonate solution. As soon as no more unchanged amino compound can be traced, 30 parts of sodium bicarbonate are added to the solution and then a solution of 30.3 parts of diazotised 2-amino-naphthalene-1,5-disulfonic acid is poured in. On completion of the coupling, sodium chloride and buffer salts are added to the reaction mixture, the precipitated dyestuff is filtered off, washed with sodium chloride solution and stabilized with buffer salts. After drying in vacuo at 40°, a red powder is obtained which dissolves in water with a red color. If mercerized cotton is padded with a 2 percent solution of this dyestuff at 20°, dried and then treated with a 1 percent sodium hydroxide solution which also contains 30 percent sodium chloride, then steamed for 30 seconds at 100°–103°, finally rinsed and soaped at the boil for 30 minutes, then a red dyeing is obtained which has very good wet and light fastness properties.

The following table 14 lists the main moieties of other dyestuffs according to the invention having similar properties which are obtained by condensing the coupling components containing amino groups given in column III with a. 2-methylamino-4-N-chloroformyl-methylamino-6-fluoro-s-triazine or equivalent parts of, b. diethylamino-4-N-chloroformyl-methylamino-6-fluoro-s-triazine, c. 2-(4'-methoxyphenoxy)-4-N-chloroformyl-methylamino-6-fluoro-s-triazine, or d. 2-(4'-chlorophenoxy)-4-N-chloroformyl-ethylamino6-fluoro-s-triazine, as described in example 152 and the condensation products are coupled as described in the same example, with the diazo components given in column II. The shades of dyeings with the resulting reaction dyes on cellulose fibers are given in column IV of table 14.

EXAMPLE 161

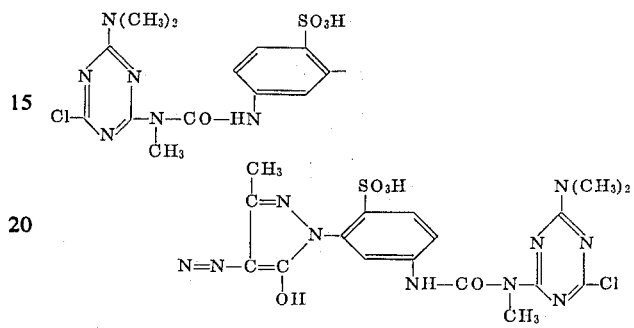

18.8 parts of 1,3-diaminobenzene-4-sulfonic acid are dissolved in 400 parts of water at a pH value of 4–4.5 and the solution is cooled to 0°–5°. Then within 15 minutes 27 parts of 2-dimethylamino-4-N-chloroformyl-methylamino-6-chloro-s-triazine dissolved in 100 parts of acetone together with an aqueous solution of sodium carbonate are dropped into this solution in such a manner that the pH value of the reaction mixture is maintained at 4–4.5. As soon as the reaction is completed, the reaction product is precipitated by addition of sodium chloride, filtered off, dissolved in 400 parts of water and diazotised at 0°–5° with 25 parts of 30 percent hydrochloric acid and 6.9 parts of sodium nitrite. The resulting diazonium compound is coupled at a pH value of 4–5 with a solution of 48 parts of the condensation product of 1-(2'-sulfonic acid-5'-aminophenyl)-3-methyl-5-pyrazolone and 2-dimethylamino-4-N-chloroformyl-methylamino-6-chloro-s-triazine (produced from the two components under the conditions described in example 152). After completion of the coupling, the new dyestuff is precipitated with sodium chloride, filtered off and washed with diluted sodium chloride solution. After drying in vacuo at 50°, a yellow powder is obtained which dissolves in water with a yellow color.

If cotton or staple fiber is dyed with the new dyestuff according to the application methods described in the preceding examples, a deep yellow dyeing of good fastness properties to light and wet is obtained.

Further dyestuffs with similar properties are obtained if the diazo and coupling components listed in the following table 15 are reacted according to the conditions given in example 161 with (a) 2-dimethylamino-4-N-chloroformyl-methylamino-6-chloro-s-triazine or equivalent parts of (b) 2-methylthio-4-N-chloroformyl-methylamino-6-chloro-s-triazine or (c) 2-dimethylamino-4-N-chloroformyl-methylamino-6-fluoro-s-triazine and are then diazotized and coupled as described in the above example to form dyestuffs, the shade of which on cellulose fibers is given in the last column of the table 15.

TABLE 14

| I | II | III | IV |
|---|---|---|---|
| Ex. No. | Diazo component | Acylatable coupling component | Shade on cellulose fibres |
| 153 (a to d) | 1-aminobenzene-2-sulphonic acid | 1-amino-8-hydroxynaphthalene-3,6-disulphonic acid | Red. |
| 154 (a to d) | 2-aminonaphthalene-1-sulphonic acid | do | Blueish red. |
| 155 (a to d) | 1-aminobenzene-2-sulphonic acid | 1-amino-8-hydroxynaphthalene-4,6-disulphonic acid | Red. |
| 156 (a to d) | 2-aminonaphthalene-1,5-disulphonic acid | do | Blueish red. |
| 157 (a to d) | 1-aminobenzene-2,4-disulphonic acid | 1-(4'-aminophenyl)-3-methyl-5-pyrazolone | Yellow. |
| 158 (a to d) | 1-aminobenzene-2,5-disulphonic acid | 2-amino-5-hydroxynaphthalene-7-sulphonic acid | Orange. |
| 159 (a to d) | 1-aminobenzene-2-sulphonic acid | 2-methylamino-5-hydroxynaphthalene-7-sulphonic acid | Do. |
| 160 (a to d) | 4-aminoazobenzene-3,4'-disulphonic acid | do | Scarlet. |

TABLE 15

| Ex. No. | Diazo component | Coupling component | Shade on cellulose fibres |
|---|---|---|---|
| 162 (a to c) | 1,3-diaminobenzene-4-sulphonic acid | 1-amino-8-hydroxy-naphthalene-4,6-disulphonic acid | Red. |
| 163 (a to c) | do | 2-amino-8-hydroxy-naphthalene-6-sulphonic acid | Red. |
| 164 (a to c) | do | 2-ethylamino-8-hydroxy-naphthalene-6-sulphonic acid | Red. |
| 165 (a to c) | do | 1-(4'-aminophenyl)-5-pyrazolone-3-carboxylic acid | Yellow. |
| 166 (a to c) | 1,4-diaminobenzene-3-sulphonic acid | do | Do. |

EXAMPLE 167

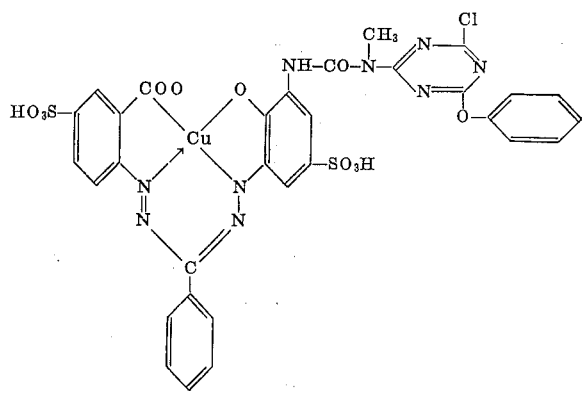

59.6 parts of copper complex compound of the aminoformazane dyestuff of the formula

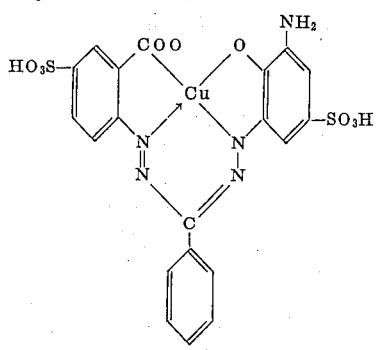

(obtained by coupling diazotized 6-acetylamino-2-amino-1-hydroxybenzene-4-sulfonic acid with the hydrazone from benzaldehyde and phenylhydrazine-2-carboxylic-acid-4-sulfonic acid, reaction with a copper salt and saponification of the acetyl-amino group) are dissolved at a pH value of 6–6.5 in 600 parts of water. 33 parts of 2-phenoxy-4-N-chloroformyl-methyl-amino-6-chloro-s-triazine dissolved in 80 parts of benzene together with an aqueous solution of sodium carbonate are dropped into this solution within 1 hour at 20°–25° so that the reaction mixture remains neutral. As soon as no more starting material can be traced, the dyestuff is precipitated by addition of sodium chloride, filtered off, washed with diluted sodium chloride solution and dried cautiously in vacuo. It is a dark powder which, dissolved in warm water, gives a blue color.

The 2-phenoxy-4-N-chloroformyl-methylamino-6-chloro-s-triazine mentioned in the preceding example is obtained by known methods by reacting 1 mol of cyanuric chloride in a first step with 1 mol methylamine and in a second step with 1 mol phenol and finally treating the condensation product with phosgene in toluene.

By using equivalent amounts of the metal-containing aminoformazane compounds shown in columns II and III of the following table 16 and the acylating agents listed in column IV, and by maintaining the reaction conditions described in the preceding example 167, further dyestuffs according to the invention are obtained which have similar properties.

TABLE 16

| I Ex. No. | II Aminoformazane dyestuff | III Metal | IV Acylating agent | V Shade on cellulose fibres |
|---|---|---|---|---|
| 168 | N-(2-hydroxy-3-aminophenyl-5-sulphonic acid)-N'-(2'-carboxy-phenyl-4'-sulphonic acid)-ms-phenyl-formazane. | Cu | 2-dimethylamino-4-N-chloroformyl-methyl-amino-6-chloro-s-triazine. | Blue. |
| 169 | do | Cu | 2-dimethylamino-4-N-chloroformyl-ethyl-amino-6-fluoro-s-traizine. | Do. |
| 170 | N-(2-hydroxy-3-aminophenyl-5-sulphonic acid)-N'-(2'-hydroxy-phenyl-3',5'-disulphonic acid)-ms-phenyl-formazane. | Cu | do | Do. |
| 171 | do | Cu | 2-ethylthio-4-N-chloro-formyl-ethylamino-6-chloro-s-triazine. | Do. |
| 172 | N-(2-hydroxy-3-aminophenyl 5-sulphonic acid)-N'-(2'-carboxy phenyl-4'-sulphonic acid)-ms-o-sulphonic acid phenyl formazane | Cu | 2-dimethylamino-4-N-chloroformyl-methyl-amino-6-chloro-s-triazine. | Do. |
| 173 | do | Cu | 2-dimethylamino-4-N-chloroformyl-methyl-amino-6-fluoro-s-triazine. | Do. |
| 174 | N-(2-hydroxy-3-aminophenyl-5-sulphonic acid)-N'-(2'-hydroxy-phenyl-3', 5'-disulphonic acid)-ms-o-sulphonic acid phenyl-formazane. | Cu | do | Do. |
| 175 | do | Cu | 2-dimethylamino-4-N-chloroformyl-methyl-amino-6-chloro-s-triazine. | Do. |
| 176 | do | Cu | 2-phenylthio-4-N-chloro-formyl-methylamino-6-chloro-s-triazine. | Do. |

EXAMPLE 177

One Hundred parts of wool are introduced into a liquor consisting of 4,000 parts of water of 40°, two parts of the dyestuff according to example 1 , five parts of 30 percent acetic acid and 0.5 part of a condensation product of stearyl amine and ethylene oxide. Within 20 minutes, the temperature of the dye bath is increased to boiling and maintained at the boil for 1 hour. After rinsing and drying, a brilliant yellow wool dyeing is obtained which has good wet and light fastness properties.

It has further been found, according to a second aspect of this invention, that another class of dyestuffs which can be fixed onto textile fibers containing hydroxyl and amino groups are produced by reacting dyestuffs of the formula

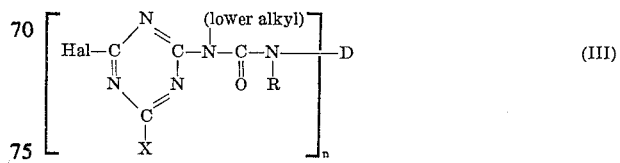

(III)

wherein
D, *n*, and R have the same meaning as in formula I, or D is the radical of a compound convertible into a dyestuff corresponding to D in Formula I, and Hal and X have the same meanings as in formula II, *n* being preferably 1, and still more preferably compounds of the formula IX, with *n* mole of a tertiary basic compound which can be quaternized, which compound contains nitrogen, to form a dyestuff of the formula

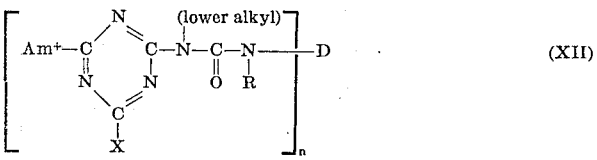
(XII)

wherein
Am$^+$ represents a quaternary ammonium group bound by means of ammonium nitrogen to the S-triazine ring and D, R, X, and *n* have the meanings given in formula III, or by producing reactive dyestuffs of formula XII from compounds which are compounds convertible into a dyestuff, and at least one of which compounds contains a radical of the formula

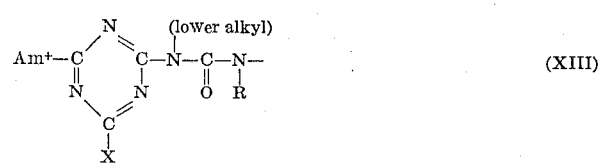
(XIII)

such production involving conventional azo coupling, condensation, and, where this is indicated, metallization.

In formulas III and XII, D represents, in particular, the radical of a technically easily accessible stable organic dyestuff, e.g., the radical of an optionally heavy metal-containing mono-, dis-, or polyazo dyestuff, of an anthraquinone, a nitro or a phthalocyanine dyestuff.

If D is the radical of an azo dyestuff then it is, e.g., the radical of a monoazo dyestuff which may or may not contain heavy metal, from the benzene-azo-benzene, benzene-azo-naphthalene, benzene-azo-pyrazole, benzene-azo-acylo-acetarylamide, naphthalene-azo-benzene, napthalene-azo-naphthalene and naphthalene-azo-pyrazole series, or it is the radical of a disazo dyestuff from the benzene-azo-benzene-azo-benzene, benzene-azo-benzene-azo-naphthalene, bnezene-azo-naphthalene-azo-benzene, benzene-azo-naphthalene-azo-naphthalene, and naphthalene-azo-benznee-azo-naphthalene series of the formazane series. If D is the radical of an anthraquinone dyestuff then it is preferably a 1-amino-4-phenylamino- or 1-amino-4-diphenylamino-anthraquinone dyestuff radical.

If D is the radical of a nitro dyestuff then it is e.g., the radical of a sulfonated nitrodiphenylamine. If D is the radical of a phthalocyanine dyestuff then it is preferably the radical of a phthalocyanine sulfonic acid alkyl or aryl amide, particularly a sulfonated one.

Preferred dyestuffs of formula XII are those in which Am$^+$ represents one of the groupings

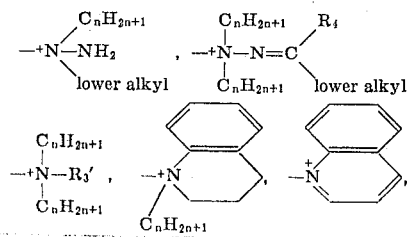

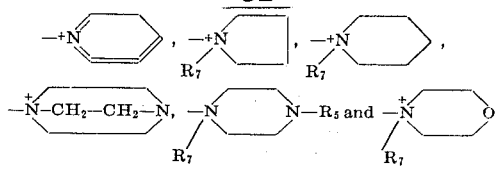

R$_7$ being methyl, ethyl, or amino,
*n* being 1 or 2,
R$_3'$ representing alkyl of from one to 10 carbon atoms, cyclohexyl or benzyl,
R$_4$ representing hydrogen or lower alkyl and
R$_5$ representing hydrogen, lower alkyl, or hydroxy-lower alkyl.

The dyestuffs mentioned can contain the substituents usual in dyestuffs. Examples of such are: halogen atoms such as fluorine, chlorine and bromine atoms, lower alkyl groups such as the methyl or ethyl group, lower alkoxy groups such as the methoxy or ethoxy group, carboxylic acid and sulfonic acid groups, acylamino groups such as the acetylamino, chloracetylamino or benzoylamino group, optionally N-substituted carboxylic and sulfonic acid amide groups, also the nitro, amino and hydroxyl group.

Advantageously, the dyestuffs contain two to five sulfonic acid groups.

An anion, e.g., a chlorine or bromine ion can serve to neutralize the quaternary ammonium group Am$^+$ of formulas XII or XIII. If the dyestuff of formula XII contains acid salt-forming groups, e.g., sulfonic acid groups, the quaternary ammonium group Am$^+$ can also form an inner salt with the anion of one of these acid groups. The quaternized compounds may thus be represented generically by the following formula

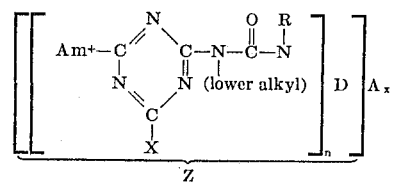

The quaternary ammonium group Am$^+$ is preferably derived from quaternizable compounds, containing tertiary basic nitrogen, of the formula

(XIV)

In this formula
R$_1$ represents an optionally substituted aliphatic hydrocarbon radical, the H$_2$N group or

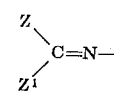

group wherein
Z is hydrogen or an optionally substituted aliphatic hydrocarbon radical and
Z' is an optionally substituted aliphatic hydrocarbon radical,
R$_2$ represents an optionally substituted aliphatic hydrocarbon radical and
R$_3$ represents an optionally substituted aliphatic hydrocarbon radical and
R$_3$ represents an optionally substituted aliphatic, cycloaliphatic, or araliphatic hydrocarbon radical, or
at least two of the symbols R$_1$, R$_2$, and R$_3$ together with the nitrogen atom, optionally with the inclusion of other hetero atoms such as oxygen or nitrogen, can form a mononuclear or polynuclear heterocyclic ring.

As optionally substituted aliphatic hydrocarbon radicals in the positions of $R_1$, $R_2$, $R_3$ and also of Z and Z', preferably alkyl radicals of at most five, in the case of $R_3$ of at most 10 aliphatic carbon atoms can be used. These alkyl radicals can contain, as substituents, e.g., the hydroxyl group or low alkoxy groups such as the methoxy or ethoxy group. However, alkenyl radicals, especially the allyl radical, or alkinyl radicals such as the propinyl radical, can be aliphatic hydrocarbon radicals in the positions mentioned.

If $R_3$ represents a cycloaliphatic hydrocarbon radical then this is, e.g., a 5 -or 6-membered cycloalkyl radical, preferably the cyclohexyl radical. If $R_3$ is an araliphatic hydrocarbon radical then it is, e.g., an $\alpha$- or $\beta$-arylalkyl radical, particularly the benzyl radical.

In a first preferred class of quaternisable compounds containing tertiary basic nitrogen of formula XIV:

a. $R_1$ and $R_2$ each represents a low alkyl radical, especially the methyl radical and $R_3$ represents an optionally substituted aliphatic, cycloaliphatic or araliphatic hydrocarbon radical, or b. at least two of the symbols $R_1$, $R_2$, and $R_3$ together with the nitrogen atom, optionally with the inclusion of further hetero atoms, can form a mono- or polynuclear heterocyclic ring.

Examples of case (a) are: trimethylamine, N,N-dimethyl-N-ethylamine, N,N-dimethyl-N-$\beta$-hydroxyethylamine, N,N-dimethyl-N-propylamine, N,N-dimethyl-N-butylamine, N,N-dimethyl-N-amylamine, N,N-dimethyl-N-allylamine, N,N-dimethyl-N-$\beta$-ethoxyethylamine, N,N-dimethyl-N-cyclohexylamine or N,N-dimethyl-N-benzylamine.

Examples of case (b) are: acetaldehyde hydrazone, N-methyl-pyrrolidine, N-methyl-piperidine or N-methyl-1,2,3,4-tetrahydroquinoline or N-methyl-morpholine or N,N'-dimethyl-piperazine. If all three R's take part in the ring formation, then the ring system consists, preferably, of two fused saturated rings wherein the nitrogen and one of $R_1$, $R_2$, and $R_3$ are components of both rings. Examples of this type of compounds are pyrrolizidine, quinuclidine, julolidine, lilolidine, hexahydrojulolidine, 1-azabicyclo-(3,2,1)-octane, 1-azabicyclo-(3,3,1)-nonane, 1,5-diazabicyclo-(3,3,1)-nonane and, preferably 1,4-diazabicyclo-(2,2,2)-octane ("-triethylenediamine").

In a second preferred class of quaternizable compounds containing tertiary basic nitrogen of formula XIV, $R_1$ represents an amino group, particularly the primary amino group, each of $R_2$ and $R_3$ represents a low alkyl radical or, together with the nitrogen atom, optionally with the inclusion of further hetero atoms, they can form a mono- or polynuclear heterocyclic ring.

If each of $R_2$ and $R_3$ together with the nitrogen atom, optionally with the inclusion of further hetero atoms, form a heterocyclic ring then this ring is, in particular, a pyrrolidine, piperidine, hexamethyleneimino, or morpholine ring. Examples of compounds of this type are N-amino-pyrrolidine, N-amino-piperidine, N-amino-hexamethyleneimine or N-amino-morpholine.

In a third preferred class of quaternisable compounds containing tertiary basic nitrogen of formula XIV:

$R_3$ represents a

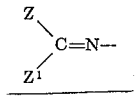

group wherein Z is hydrogen or a low alkyl radical and
Z' represents a low alkyl radical, and
$R_2$ and $R_3$ are each of low alkyl radical.

As low alkyl radicals for Z and Z', those containing one to four carbon atoms are preferred. $R_2$ and $R_3$ preferably represent the methyl group. Examples of such compounds are hydrazones from acetaldehyde, acetone, methylethyl ketone or diethyl ketone and N,N-dimethyl-hydrazine.

A further preferred class of quaternizable compounds containing tertiary basic nitrogen are unsaturated-cyclic tertiary amines. These are preferably aromatic-heterocyclic amines, e.g., quinoline, isoquinoline, or, particularly, pyridine, which can be substituted, e.g., by alkyl radicals and particularly by the methyl radical.

Examples of monovalent electron-donating substituent X are an alkoxy group such as the methoxy or ethoxy group; an aryloxy group, principally the unsubstituted phenoxy group, also however, a phenoxy group substituted by halogen, e.g., chlorine, low alkyl or alkoxy groups; a thioether group, i.e., an alkylthio group such as the methylthio or ethylthio group, as well as an arylthio group, particularly the unsubstituted phenylthio group or the phenylthio group substituted by halogen, e.g., chlorine, low alkyl or alkoxy groups. Preferably however, X is a secondary or tertiary amino group, in particular a monoalkylamino or a dialkylamino group such as the methylamino, ethylamino, isopropylamino, t-butylamino, $\beta$-hydroxyethylamino group or the dimethylamino, diethylamino, dipropylamino, dibutylamino or de-($\beta$-hydroxyethyl)-amino group. X can also be derived from saturated heterocyclic nitrogen bases such as piperidine or morpholine; or X can be a cyclohexylamino group or a benzyl-amino, phenylamino or N-low alkyl-N-phenylamino group, the benzene nucleus of which can be substituted by halogen, e.g., chlorine, low alkyl, or alkoxy groups.

The starting materials of formula III are obtained, for example, by condensing an organic dyestuff of formula I with n molecular proportion of a carbamic acid chloride of formula VI, as described under the first aspect of this invention.

Several of the quaternizable compounds according to the invention are known; all can be produced in a known way.

The reaction of the organic dyestuffs of formula III with the quaternizable compounds containing tertiary basic nitrogen is performed advantageously in a solvent at low temperatures, preferably at 10°–60° C., the nitrogen compounds mentioned generally being used in excess. As solvent, principally water or a mixture of water with an inert organic solvent which is advantageously miscible with water such as acetone, methylethyl ketone, dioxan, or dimethyl formamide, is used. The end products are isolated and dried with care, for example by salting out with sodium chloride in neutral or weakly acid solution or by precipitating in an organic solvent such acetone, and by drying at a moderately raised temperature, preferably in vacuo.

Reactive dyestuffs of formula XII are obtained by a modified process also by forming them from components of which at least one contains the radical of formula XIII. This method is particularly suitable for the production of azo dyestuffs by coupling an aromatic diazonium compound with a coupling component of which at least one contains the reactive grouping of formula XIII.

In a first method of performing this modified process, for example, the diazonium compound of an amine of the formula

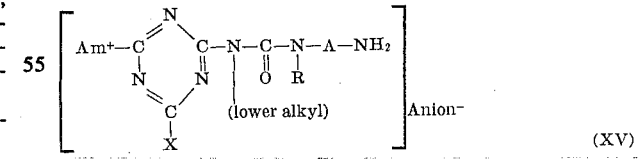

(XV)

wherein Am+, R, X and A have the same meanings as given hereinbefore, A being particularly a radical of the benzene, diphenyl, naphthalene, benzene-azo-benzene, benzene-azo-naphthalene or naphthalene-azo-naphthalene series, is coupled with a coupling component B—H wherein B represents the radical of a coupling component as defined in formula IV, particularly a radical of the hydroxybenzene, aminobenzene, hydroxy- or amino-naphthalene, hydroxy- or amino-pyrazole, or acyloacetylarylamide series, to form an azo dyestuff of the formula

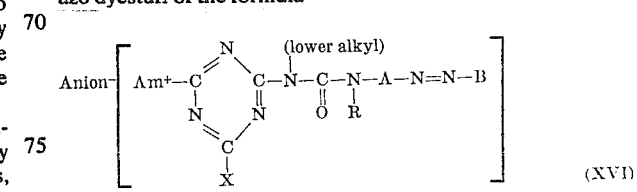

(XVI)

and optionally, dyestuffs of formula XVI possessing metallizable groupings of substituents, can be further reacted with agents yielding heavy metal, e.g., copper, nickel, chromium, or cobalt, to obtain the corresponding metal complex dyes.

Preferred anions "Anion⁻" in formula XV and subsequent formulas are chlorine or bromine. If A or B, infra, contains sulfonic acid groups, one of the latter may form an inner salt with Am⁻ so that no outer anion is required to satisfy the positive charge of Am⁻.

In another method of performing the modified process, the diazonium compound of an amine A—NH₂ wherein A has the meaning given in formula XV, is coupled with a coupling component of the formula

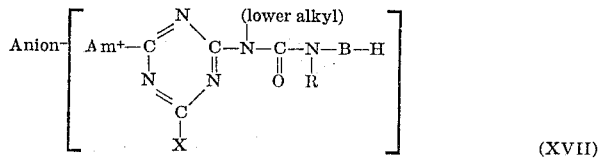

(XVII)

wherein Am⁺, B, R and X have the meanings given hereinbefore, to form a dyestuff of the formula

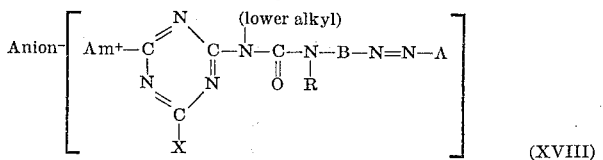

(XVIII)

wherein Am⁺, A, B, R, and X have the meanings given hereinbefore; optionally dyestuffs of formula XVIII, thus obtained which possess metallizable groupings of substituents, can be reacted with agents giving off heavy metal, e.g., copper, nickel, chromium, or cobalt.

Azo dyestuffs having two radicals of formula XIII are obtained, e.g., by coupling the diazonium compound of an amine of formula XV with a coupling component of formula XVII.

In each case, the coupling is performed by the usual methods in a weakly acid to weakly alkaline medium.

Both the coupling as well as the metallization must be performed under mild conditions, i.e., high pH values and temperatures must be avoided.

The dyestuffs obtained can be stabilized by admixture with buffer substances, e.g., with mixtures of primary and secondary alkali phosphates or with alkali metal salts of sulfonated tertiary aromatic amines, i.e., for example, with the sodium salt of N,N-dimethylaniline-3-sulfonic acid.

Dyestuffs of formula XII which contain a water solubilizing salt-forming group, preferably the sulfonic acid group, are particularly suitable for the dyeing of natural and synthetic polyamide fibers containing amino groups. In this case, aftertreatment of the dyeing with acid-binding agents such as ammonia or hexamethylenetetramine causes an improvement of the wet fastness.

Water-soluble reactive dyestuffs according to the invention of formula XII containing two to five sulfonic acid groups are used principally for the dyeing and printing of textile fibers containing hydroxyl groups, in particular of natural or regenerated cellulose fibers. By impregnating the textiles with aqueous dyestuff solutions or by printing them with thickened dyestuff solutions, drying the impregnated material and treating them with acid-binding agents, optionally while heating or steaming, and after thorough rinsing and soaping, dyeings and prints are obtained which are distinguished by excellent wet fastness properties and good fastness to light. What has been said with regard to dyeing techniques and fastness properties of dyeings obtained with dyestuffs according to the first aspect of this invention also applies in essence to the dyestuffs of the second aspect thereof.

The dyestuffs according to this aspect of the invention are also suitable for the dyeing of hydroxyl groups containing fibers by the exhaustion process. For this purpose, during or after dyeing, which is promoted, advantageously, by the addition of neutral salts such as sodium sulfate or chloride to the dyebath, the dyestuff is fixed by treatment with acid-binding agents.

As acid-binding agents, preferably sodium or potassium bicarbonate, sodium or potassium carbonate, sodium metasilicate, trisodium phosphate, sodium hydroxide solution and also the sodium or potassium salt of trichloroacetic acid are used. In addition, the dye liquor or printing paste can contain other additives for example salts such as sodium sulfate or chloride, or auxiliaries such as acid amides, e.g., urea, or additives which prevent reduction such as nitrobenzene sulfonic acid.

The reactive dyestuffs of formula XII are fixed with advantage at room temperature or at raised temperatures up to about 150°C.

The dyestuffs of formula XII according to the invention are distinguished by very great reactivity and in addition they produce dyeings and prints having very good wet fastness properties. Their reactivity is very much greater, usually at least 10 times and in some cases, even a hundred times greater, dependent on the nature of the substitution of the amino group Am⁺, than that of the starting materials of formula III, for which reason they can be fixed onto the fiber under considerably milder conditions than the starting compounds.

Also, compared with known dyestuffs containing the s-triazine radical bound to the dyestuff by way of anamino group, the corresponding dyestuffs of formula XII according to the invention have increased reactivity.

It is certainly unexpected that the urea bridge remains stable in the quaternization of the dyestuffs. Because, normally, the stability of the urea bridge is reduced on replacing the electron-donating substituent X by an electron-attracting substituent, it was much more to be expected that the saponification of the urea bridge would be very greatly facilitated by the introduction of the positive charge into the s-triazine ring.

The terms "low" or "lower" used in this specification and the appended claims in connection with an aliphatic radical mean that such radical has from one to five carbon atoms.

The following nonlimitative examples illustrate the invention further. The temperatures are given therein in degrees Centigrade. Everywhere, Q⁻ represents an anion in ion relationship to the ammonium group, e.g., a chlorine, bromine, or a sulfonate ion, which latter replaces one of the sulfonic acid groups shown in the formulas.

EXAMPLE 178

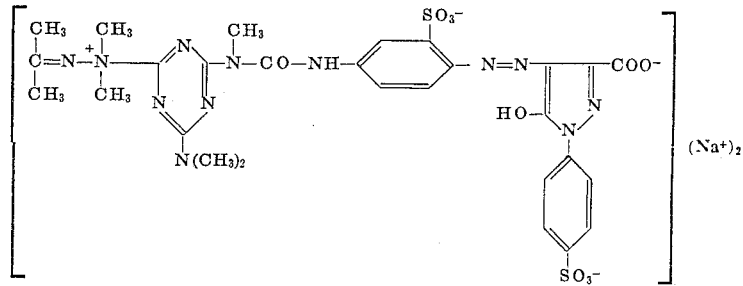

69.7 g. of the dyestuff of the formula

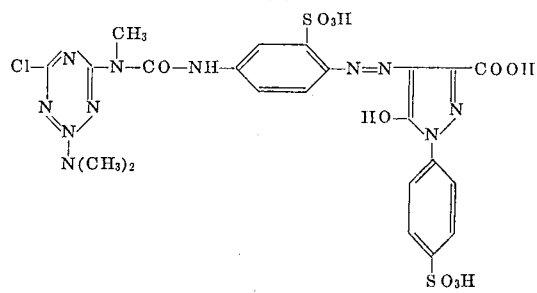

produced by condensation of the aminomonoazo dyestuff of the formula

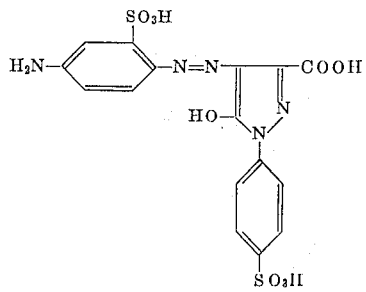

with 2-chloro-4-dimethylamino-6-N-chloroformyl-N-methylamino-s-triazine, are dissolved in 1,000 ml. of water. The pH of the solution is 7. At 25°–30°, 12 g. of acetone-N,N-dimethyl-hydrazone are added to this solution whereupon the pH rises to about 9.4–9.6. As soon as no more starting material can be traced, the pH of the solution is adjusted to 6.5. The reaction product is precipitated by the addition of sodium chloride, filtered off, washed with dilute sodium chloride solution and dried in vacuo at 50°–60°. The end product is a red-yellow powder which dissolves in water with a yellow color. Its constitution corresponds to the first formula given above.

If cotton is pad-dyed in a foulard with a 2 percent aqueous solution of this dyestuff which also contains 2 percent of sodium carbonate, the impregnated goods are stored for 4 hours at room temperature, then soaped at the boil and rinsed, a reddish yellow dyeing is obtained which has very good wet and light fastness properties.

If, instead of the 69.7 g. of the monoazo dyestuff containing chloro-s-triazinyl groups used in this example, equivalent amounts of each of the azo dyestuffs containing chloro- or bromo-s-triazinyl groups are used, which are obtained by condensation of an amino-azo dyestuff given in column II of the following table 1 with the acylating agent given in column III thereof, and each of these azo dyestuffs is reacted, respectively, with acetone-N,N-dimethyl-hydrazone, trimethylamine, N,N-dimethyl-N-ethylamine, N,N-dimethyl-N-β-hydroxy-ethylamine, N,N-dimethyl-N-allylamine, N,N-dimethyl-N-cyclohexylamine, N-methyl-pyrrolidine, N-methyl-morpholine, N,N-dimethyl-hydrazine, N-aminopiperidine, N-amino-morpholine, pyridine, 3-methyl-pyridine or 1,4-diazabicyclo-(2,2,2,)-octane, respectively, as described in the above example, then reactive dyestuffs are obtained which produce light and wet fast dyeings on cellulose or polyamide fibers by the dyeing processes usual for these dyestuffs, e.g., that described in this example. The shade on cellulose fibers is given in column IV.

TABLE 17

| I | II | III | IV |
|---|---|---|---|
| Example No. | Aminoazo dyestuff | Acylating agent | Shade on cellulose fibres |
| 179 | 2-aminonaphthalene-4,8-disulphonic acid→1-amino-3-methylbenzene | 2-chloro-4-ethylamino-6-N-chloroformyl-N-ethylamino-s-triazine | Yellow. |
| 180 | 2-aminonaphthalene-5,7-disulphonic acid→aminobenzene | do | Do. |
| 181 | 2-aminonaphthalene-4,8-disulphonic acid→1-amino-2-methoxy-5-methylbenzene | do | Do. |
| 182 | 4-aminoazobenzene-3,4'-disulphonic acid→1-amino-3-methylbenzene | 2-bromo-4-dimethylamino-6-N-chloroformyl-N-methylamino-s-triazine | Orange. |
| 183 | 1-amino-3-acetylaminobenzene-6-sulphonic acid→1-(2'-chloro-5'-sulphophenyl)-3-methyl-5-hydroxypyrazole, saponified | 2-chloro-4-diethylamino-6-N-chloroformyl-N-ethyl-amino-s-triazine | Yellow. |
| 184 | 1-amino-3-acetylaminobenzene-6-sulphonic acid→1[4', 8'-disulphonaphthyl-(2')]-3-methyl-5-hydroxypyrazole, saponified | do | Do. |
| 185 | 2-amino-4-nitrobenzene-1-sulphonic acid→1-benzoylamino-8-hydroxynaphthalene-4,6-disulphonic acid, reduced | 2-chloro-4-ethylamino-6-N-chloroformyl-N-ethylamino-s-triazine | Red. |
| 186 | 2-amino-4-nitrobenzene-1-sulphonic acid→1-benzoylamino-8-hydroxynaphthalene-3,6-disulphonic acid, reduced | do | Red. |
| 187 | 2-amino-4-acetylaminobenzene-1-sulphonic acid→1-hydroxy-naphthalene-4,6-sidulphonic acid, saponified | 2-bromo-4-ethylamino-6-N-chloroformyl-N-ethyl-amino-s-triazine | Red-orange. |
| 188 | 1-aminobenzene-2,5-disulphonic acid→2-amino-5-hydroxy-naphthalene-7-sulphonic acid | do | Orange. |
| 189 | 1-amino-2-hydroxy-3-acetylaminobenzene-5-sulphonic acid→2-carboxy-5-sulphobenzaldehyde-phenylhydrazone copper complex, saponified | 2-bromo-4-ethylamino-6-N-chloroformyl-N-ethyl-amino-s-triazine | Blue. |
| 190 | 1-amino-2-hydroxy-3-acetylaminobenzene-5-sulphonic acid→2-carboxy-5-sulphobenzaldehyde-4'-sulphophenylhydrazone, copper complex, saponified | do | Do. |
| 191 | 1-aminobenzene-2,5-disulphonic acid→1-(4'-aminobenzoylamino)-8-hydroxynaphthalene-3,6-disulphonic acid | 2-chloro-4-ethylamino-6-N-chloroformyl-N-ethylamino-s-triazine | Red. |
| 192 | 2-amino-4-acetylaminobenzene-1-sulphonic acid→2-amino-naphthalene-5,7-disulphonic acid, saponified | do | Orange. |
| 193 | 1-aminobenzene-2,5-disulphonic acid→1-(4'-aminobenzoylamino)-8-hydroxynaphthalene-4,6-disulphonic acid | do | Red. |
| 194 | 2-amino-1-hydroxybenzene-4,6-disulphonic acid→1-(3'-nitrobenzoyl-amino)-8-hydroxynaphthalene-3,6-disulphonic acid, reduced, copper complex | do | Violet. |
| 195 | 2-amino-1-hydroxy-6-chlorobenzene-4-sulphonic acid→2-amino-5-hydroxynaphthalene-7-sulphonic acid, copper complex | do | Ruby. |
| 196 | 2-amino-1-hydroxybenzene-4-sulphonic acid→2-amino-8-hydroxy-naphthalene-6-sulphonic acid copper complex | 2-chloro-4-methylamino-6-N-chloroformyl-N-methyl-amino-s-triazine | Bordeaux. |
| 197 | 6-nitro-1-amino-2-hydroxynaphthalene-4-sulphonic acid→2-amino-5-hydroxynaphthalene-7-sulphonic acid, chromium complex 1:2 | do | Black. |
| 198 | 2-amino-4-acetylamino-1-hydroxybenzene-6-sulphonic acid→1-phenylamino-8-hydroxynaphthalene-4,6-disulphonic acid, copper complex, saponified | 2-chloro-4-methylamino-6-N-cholroformyl-N-methyl-amino-s-triazine | Navy blue. |
| 199 | 2-amino-6-acetylamino-1-hydroxybenzene-4-sulphonic acid→1-hydroxynaphthalene-4,6-disulphonic acid, copper complex, saponified | 2-bromo-4-ethylamino-6-N-choloroformyl-N-ethyl-amino-s-triazine | Ruby red. |
| 200 | 2-amino-6-acetylamino-1-hydroxybenzene-4-sulphonic acid→1-(2',5'-disulphophenyl)-3-methyl-5-hydroxypyrazole, copper complex, saponified | do | Yellow-brown. |
| 201 | 1-amino-3-acetylaminobenzene-6-sulphonic acid→1-(2',5'-disulpho-phenyl)-3-methyl-5-hydroxypyrazole, saponified | 2-chloro-4-phenylamino-6-N-chloroformyl-N-ethyl-amino-s-triazine | Yellow. |

TABLE 17.—Continued

| I Example No. | II Aminoazo dyestuff | III Acylating agent | IV Shade on cellulose fibres |
|---|---|---|---|
| 202 | do | 2-chloro-4-benzylamino-6-N-cholroformyl-N-methyl-amino-s-triazine. | Do. |
| 203 | do | 2-chloro-4-cyclohexylamino-6-N-chloroformyl-N-ethylamino-s-triazine. | Do. |
| 204 | do | 2-chloro-4-butylamino-6-N-chloroformyl-N-ethylamino-s-triazine. | Do. |
| 205 | do | 2-chloro-4-isobutylamino-6-N-chloroformyl-N-ethyl-amino-s-triazine. | Do. |
| 206 | do | 2-chloro-4-piperidino-6-N-chloroformyl-N-ethylamino-s-triazine. | Do. |
| 207 | 1-amino-3-acetylaminobenzene-6-sulphonic acid→1-(2',5'-disulphophenyl)-3-methyl-5-hydroxypyrazole, saponified. | 2-chloro-4-morpholino-6-N-chloroformyl-N-methyl-amino-s-triazine. | Do. |
| 208 | 1-amino-benzene-2,5-disulphonic acid→2-methylamino-5-hydroxy-naphthalene-7-sulphonic acid. | 2-chloro-4-diethylamino-6-N-chloroformyl-N-methyl-amino-s-triazine. | Orange. |
| 209 | 1-amino-benzene-2,5-disulphonic acid→2-amino-5-hydroxy-naphthalene-7-sulphonic acid. | 2-chloro-4-dimethylamino-6-N-chloroformyl-N-methyl-amino-s-triazine. | Do. |
| 210 | 2-amino-naphthalene-1,5-disulphonic acid→1-(3'-amino-benzoyl-amino)-8-hydroxy-naphthalene-3,6-disulphonic acid. | 2-chloro-4-ethylamino-6-N-chloroformyl-N-ethyl-amino-s-triazine. | Red. |

Example 211

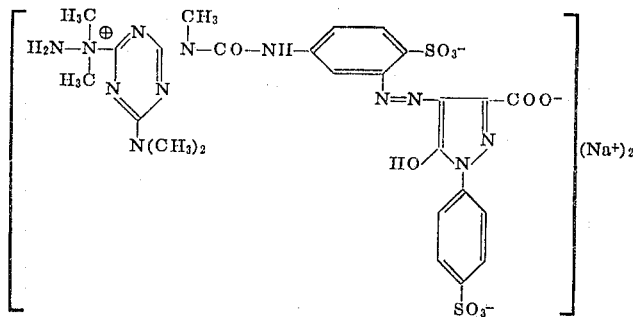

40.2 g of the compound of the formula

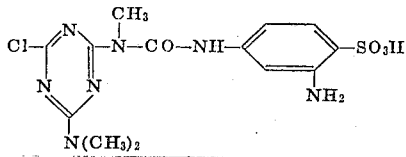

produced by condensation of 1,3-diminobenzene-6-sulfonic acid with 2-chloro-4-dimethylamino-6-N-chloroformyl-N-methyl-amino-s-triazine, are slurried in 500 ml. of water. The pH of the slurry is 7. 9.0 grams of N,N-dimethyl-hydrazine are added whereupon the pH value rises to 9.6–9.8 but during the reaction, which is performed at 25°–30°, it sinks again to 8.3–8.5.

The compound of the formula

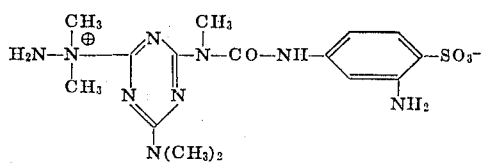

is precipitated by the addition of sodium chloride with the addition of a little alcohol. It is filtered off under suction and washed with sodium chloride solution. The moist filter residue is dissolved in 600 ml. of water, the solution is cooled to 0° and first 25 ml. of 36.5 percent hydrochloric acid and then 16.7 ml. of 33.3 percent sodium nitrite solution are added. On completion of the diazotization, the excess nitrous acid is decomposed with sulfamic acid and the diazo solution is poured into a solution of 28.4 g. of 1-(4'-sulphophenyl)-5-hydroxypyrazole-3-carboxylic acid in 150 ml. of water, the pH being kept at 5.5–6.0 with 20 percent sodium carbonate solution. The dyestuff is precipitated with sodium chloride, filtered off and washed with sodium chloride solution and dried into vacuo. The dyestuff is in the form of a yellow powder which dissolves in water with a yellow color. Its constitution corresponds to the first formula given above.

If regenerated cellulose is pad dyed in a foulard with a 2 percent aqueous solution of this dyestuff which also contains 20 g. of sodium bicarbonate and 200 g. of urea per liter, the impregnated goods are dried and heated for 2 minutes at 100°–110°, then a yellow dyeing is obtained which has very good fastness to washing and light.

If, instead of the 40.2 g. of the compound containing chloro-s-triazinyl groups used in this example, equivalent amounts of a compound, obtained by condensation of 1,4-diminobenzene-3-sulfonic acid with 2-chloro-4-dimethylamino-6-N-chloroformyl-N-methylamino-s-triazine or of 1,3-diminobenzene-4-sulfonic acid or 1,4-diminobenzene-3-sulfonic acid with the acylating agents given in examples 179, 482, 183, 187, 196 and also 201–207 and also 24–30, are used and this compound is reacted with N,N-dimethyl-hydrazine, trimethylamine, N,N-dimethyl-N-amylamine, N,N-dimethyl-N-benzylamine, N-methyl-piperidine, acetone-N,N-dimethyl-hydrazone, N-methyl-1,2,3,4-tetrahydroquinoline, 1,4-diazabicyclo-(2,2,2-octane, N-amino-pyrrolidine or 2-methyl-pyridine, the amino compound obtained is diazotised, this diazo component is coupled with one of the coupling components given in column II of the following table 18, and the dyestuff obtained is dyed onto cellulose fibers as described in this example, then wash and light fast dyeings are also obtained which have the shades given in column III of this table.

TABLE 18

| I Example No. | II Coupling component | III Shade on cellulose fibres |
|---|---|---|
| 212 | 1-[5',7'-disulphonaphthyl-(2')]-3-methyl-5- | Yellow. |

TABLE 18—Continued

| Example No. | Coupling component | Shade on cellulose fibres |
|---|---|---|
| | hydroxy-pyrazole. | |
| 213 | 1-(2',5'-disulphophenyl)-3-methyl-5-hydroxy-pyrazole. | Do. |
| 214 | 1-acetylamino-8-hydroxynaphthalene-3,6-disulphonic acid. | Red. |
| 215 | 1-acetylamino-8-hydroxynaphthalene-4,6-disulphonic acid. | Red. |
| 216 | 1-hydroxynaphthalene-3,6-disulphonic acid | Orange red. |

EXAMPLE 217

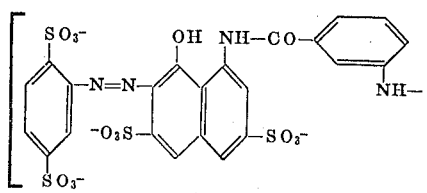

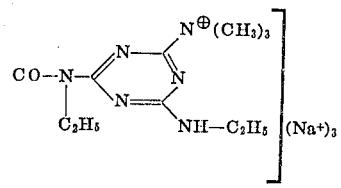

22.5 ml. of an aqueous 40 percent trimethylamine solution are added to a solution, the pH of which is 7, of 66.6 g. of the compound of the formula

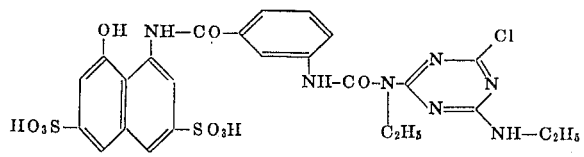

(obtained by condensation of 1-[3'-aminobenzoylamino]-8-hydroxy-naphthalene-3,6-disulfonic acid with 2-chloro-4-ethylamino-6-N-chloroformyl-N-ethylamino-s-triazine) in 1,200 ml. of water, whereupon the pH rises to 9.4. The reaction mixture is stirred for 4–5 hours at 25°–30°. As the reaction proceeds the pH sinks again to 8.4–8.6. When no more starting material can be traced, the compound of the formula

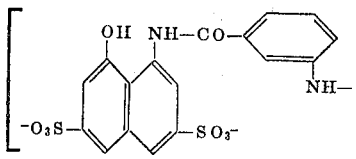

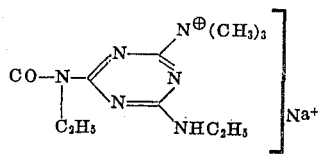

is isolated by the addition of sodium chloride and a little alcohol and filtering off under suction of the precipitate. The filter residue is washed with sodium chloride solution and, while still moist, is dissolved in 1,000 ml. of water with a neutral reaction.

Also, 25.3 g. of 1-aminobenzene-2,4-disulfonic acid are dissolved in 250 ml. of water and, at 0°–5°, 25 ml. of 36.5 percent hydrochloric acid and 16.7 ml. of 33.3 percent sodium nitrite solution are added. The whole is stirred for 2 hours at 0°–5° and the excess nitrous acid is decomposed with sulfamic acid. This diazo solution is then added to the solution of the coupling component, the pH being kept constant at about 7, whereupon the dyestuff of the first formula given above is formed. This is precipitated by the addition of acetone and isolated and dried in the usual way. The dyestuff is in the form of a dark red powder which dissolves in water with a red color. It dyes cellulose and polyamide fibers by the processes usual for reactive dyestuffs in wet and light fast red shades.

If instead of the 66.6 g. of the compound containing chloro-s-triazinyl groups used in this example, equivalent amounts of a compound, obtained by condensation of 1-(4'-aminobenzoylamino)-8-hydroxynaphthalene-4,6-disulfonic acid, 2-amino-8-hydroxy-naphthalene-6-sulfonic acid or 2-amino-5-hyroxynaphthalene-7-sulfonic acid with 2-chloro- or 2-bromo-4-ethylamino-6N-chloro-formyl-N-ethylamino-s-triazine, are reacted with N,N-dimethyl-N-ethylamine, N-methyl-pyrrolidine, 1,4-diazabicyclo-(2,2,2)-octane N,N-dimethyl-hyrazine, N-amino-morpholine, acetone-N,N-dimethyl-hydrazone or pyridine, the product obtained is coupled, as described in the example, with diazotised 1-aminobenzene-2,4-disulfonic acid, then dyestuffs are obtained which also produce good wet and light fast red or orange dyeings on cellulose fibers by the processes usual for reactive dyestuffs.

EXAMPLE 218

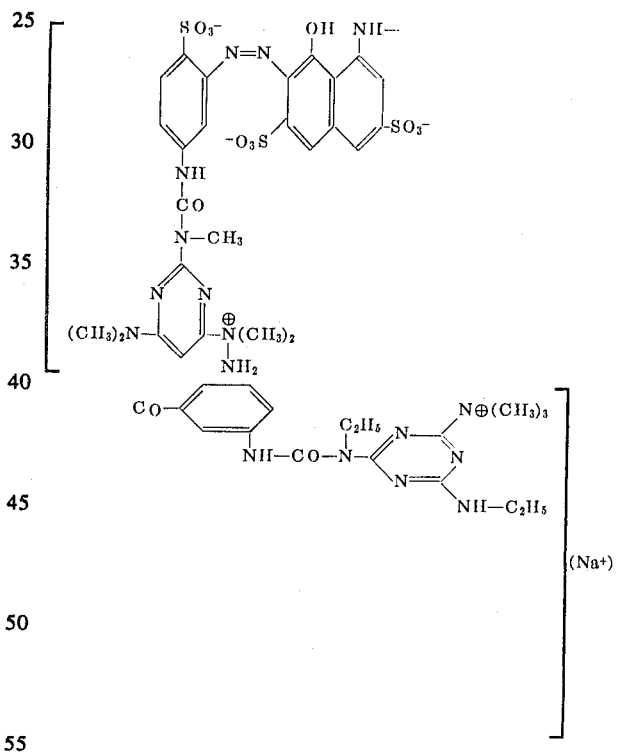

The diazonium compound of the amine, obtained according to example 211, of the formula

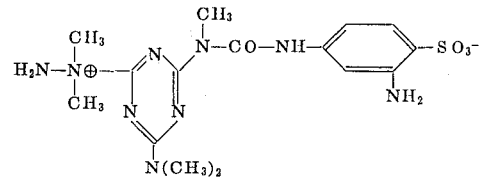

is coupled with the coupling component of the formula

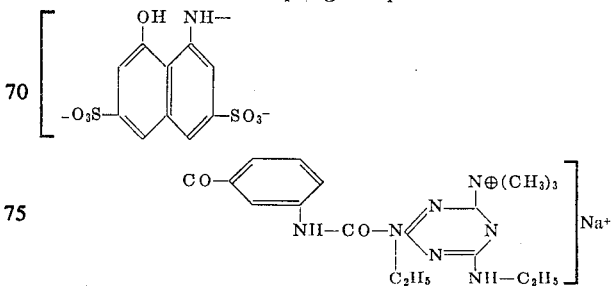

as described in example 217. The dyestuff is precipitated with sodium chloride, filtered off under suction and dried in vacuo. It is in the form of a dark red powder which dissolves in water with a red color. It dyes cellulose and polyamide fibers by the processes usual for reactive dyestuffs in wet and light fast red shades. Its constitution corresponds to the first formula given above.

EXAMPLE 219

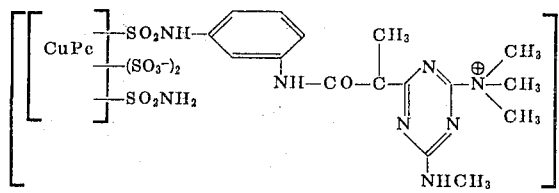

In this formula Pc represents the phthalocyanine structure, 118 g. of the phthalocyanine dyestuff of the formula

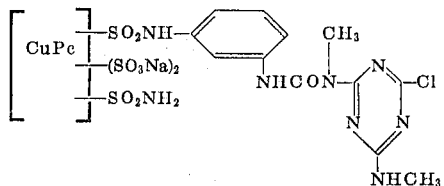

wherein Pc has the meaning given above (obtained by the processes usual for phthalocyanine dyestuffs), are dissolved in 1,000 g. of water with a neutral reaction and, at 20°–25°, 8 g. of trimethylamine are added. The pH of the reaction solution rises by about 1–2 units during the addition. As soon as the reaction is complete, the pH of the mixture is adjusted to 7 with dilute hydrochloric acid and then the new dyestuff is precipitated by the addition of sodium chloride, isolated and dried in vacuo at 40°–50°.

If mercerized cotton is pad-dyed in a foulard with a 2 percent solution of this dyestuff at 20°, dried, and then treated with a 1 percent sodium hydroxide solution which also contains 30 percent of sodium chloride, then steamed for 30 seconds at 100°–103° and finally is rinsed, and soaped at the boil for 30 minutes, then a pure turquoise blue dyeing is obtained which has very good wet and light fastness.

Other dyestuffs having similar properties are obtained if the dyestuffs given in the following table 19 are reacted with trimethylamine or equivalent amounts of N,N-dimethyl-N-β-hydroxy-ethylamine, N,N-dimethyl-N-allylamine, N,N-dimethyl-N-benzyl-amine, N,N-dimethyl-hydrazine, N-methyl-pyrrolidine, N-methyl-morpholine, N-amino-piperidine, N-amino-morpholine, 1,4-diazabicyclo-(2,2,2)-octane, N-methyl-1,2,3,4-tetrahydroquinoline, quinoline, pyridine, 2-methyl-pyridine or acetone-N,N-dimethyl-hydrazone. Their shade on cellulose fibers is also turquoise blue.

TABLE 19

| Example No. | Phthalocyanine dyestuff |
|---|---|
| 220 | |
| 221 | |
| 222 | |
| 223 | |
| 224 | |

EXAMPLE 225

79.6 g of the anthraquinone dyestuff of the formula (obtained by sulfonating 1-amino-4-(4'-aminophenylamino)-anthraquinone2,7-disulfonic acid and condensing the isolated dyestuff with 2-ethylamino-4-N-chloroformyl-N-ethylamino-6-chloro-s-triazine) are dissolved in 1,500 g. of water. The solution has a pH of 7. 8.0 grams of N.N-dimethyl-hydrazine are added to this solution at 20°–25° whereupon the pH rises to 8–9. On completion of the reaction, the pH of the dyestuff solution is again adjusted to 7 with dilute hydrochloric acid and the new dyestuff is precipitated by the addition of sodium chloride, filtered off, washed with sodium chloride solution and dried in vacuo at 40°–50°. It is a dark blue powder which dissolves in water with a blue color.

Dyestuffs having similar properties are obtained if the aminoanthraquinone dyestuffs given in column II of the following table 30 are reacted with the acylating agents given in column III and the dyestuffs so condensed are reacted according to example 222 with N,N-dimethyl-hydrazine or equivalent amounts of trimethylamine, N,N-dimethyl-n-ethylamine, N,N-dimethyl-N-amylamine, N,N-dimethyl-N-cyclohexylamine, N-methyl-pyrrolidine, N-methyl-piperidine, N-methyl-piperazine, N-methyl-morpholine, N-amino-pyrrolidine, N-amino-piperidine, N-amino-morpholine, 1,4-diazabicyclo-(2,2,2)-octane, pyridine, quinoline or acetone-N,N-dimethyl-hydrazone. Their shade on cellulose fibers is blue.

TABLE 20

| Example No. | Aminoanthraquinone dyestuff | Acylating agent |
|---|---|---|
| 226 | | |
| 227 | | |
| 228 | | |
| 229 | | |
| 230 | | |
| 231 | | Same as above. |
| 232 | | Do. |

TABLE 20—Continued

| Example No. | Aminoanthraquinone dyestuff | Acylating agent |
|---|---|---|
| 233 | Same as above | [structure: triazine with Br, NHCH₃, N(CH₃)—COBr] |
| 234 | [structure: anthraquinone with NH₂, SO₃H, NH-phenyl(SO₃H)-NH-CH₃] | [structure: triazine with Cl, N(CH₃)₂, N(CH₃)—COCl] |

What is claimed is:

1. An azo dyestuff of the formula $$\left[ Hal-\underset{\underset{X}{\overset{N}{\parallel}}}{\overset{N}{\underset{\parallel}{C}}}-\underset{(lower\ alkyl)}{N}-\overset{O}{\overset{\parallel}{C}}-N-D \right]_n$$

herein D represents the radical of a monoazo dyestuff selected from the benzene-azo-benzene,
   benzene-azo-naphthalene,
   benzene-azo-pyrazole,
   benzene-azo-acetoacetylarylamide,
   naphthalene-azo-naphthalene,
   naphthalene-azo-pyrazole series, or a disazo dyestuff selected from the benzene-azo-benzene-azo-benzene,
   benzene-azo-naphthalene-azo-benzene,
   naphthalene-azo-benzene-azo-benzene series, all of which monoazo and disazo dyestuffs may be free from or may contain heavy metal in complex bond, or a metal-containing formazane dyestuff $$\overset{R}{\underset{N}{|}}$$

is connected to an aromatic ring carbon of D,
   R is H or lower alkyl;
   Hal is F, Cl, or Br;
   n is one of the integers 1 and 2, and
   X is a monovalent electron-donor substitutent, selected from the group of lower alkoxy, phenoxy, halogen-substituted phenoxy, lower alkyl-substituted phenoxy, lower alkoxy-substituted phenoxy, lower alkylthio, phenylthio, halogen-substituted phenylthio, lower alkyl-substituted phenylthio, lower alkoxy-substituted phenylthio, lower alkylamino, di (lower) alkylamino, phenylamino, N-lower alkyl-N-phenylamino, N-lower alkyl-N-halogenphenylamino, N-lower alkyl-N-lower alkylphenylamino, N-lower alkyl-N- lower alkoxyphenylamino, piperidino or morpholino, halogen being chloro or bromo.

2. An azo dyestuff according to claim 1, wherein X is a dialkylamino radical, each alkyl moiety of said radical having up to four carbon atoms.

3. An azo dyestuff according to claim 1 of the formula

[structure with OH, SO₃⁻, N=N, C₂H₅, NHCO-triazine with F and NHC₂H₅] $(Q^+)_3$ wherein $Q^+$ represents hydrogen ion, ammonium ion, sodium or potassium ion.

4. An azo dyestuff according to claim 1 of the formula

[structure: triazine with C₂H₅-NH, C₂H₅-N-CO-NH-phenyl(SO₃⁻)-N=N-naphthalene(OH, NH, SO₃⁻, -O₃S, CO-phenyl)] $(Q^+)_3$ wherein $Q^+$ represents hydrogen ion, ammonium ion sodium or potassium ion.

5. An azo dyestuff according to claim 1 of the formula

[structure: (CH₃)₂N-triazine-Cl, N(CH₃)-CO-NH-phenyl(SO₃⁻)-N=N-naphthalene(OH, SO₃⁻, SO₃⁻)] $(Q^+)_3$ wherein $Q^+$ represents hydrogen ion, ammonium ion sodium or potassium ion.

6. An azo dyestuff according to claim 1 of the formula

[structure: triazine with F, NH-C₂H₅, N-C₂H₅-CO-NH-phenyl-N=N-C(COO⁻)=C(OH)-pyrazole-N-phenyl-SO₃⁻, SO₃⁻] $(Q^+)_3$ wherein $Q^+$ represent hydrogen ion, ammonium ion sodium or potassium ion.

* * * * *